United States Patent
Horton et al.

(10) Patent No.: US 7,502,030 B2
(45) Date of Patent: Mar. 10, 2009

(54) SYSTEM AND METHOD FOR RESAMPLING TEXTURE MAPS

(75) Inventors: Noah Horton, Boulder, CO (US); Bradford A. Ritter, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 342 days.

(21) Appl. No.: 11/351,211

(22) Filed: Feb. 9, 2006

(65) Prior Publication Data

US 2006/0125840 A1    Jun. 15, 2006

(51) Int. Cl.
*G09G 5/00* (2006.01)

(52) U.S. Cl. .................. 345/582; 345/423; 345/426; 345/581

(58) Field of Classification Search ............. 345/582, 345/423, 426, 581
See application file for complete search history.

(56) References Cited

U.S. PATENT DOCUMENTS

| | | | |
|---|---|---|---|
| 5,194,969 A * | 3/1993 | DiFrancesco | 358/463 |
| 5,461,712 A * | 10/1995 | Chelstowski et al. | 345/543 |
| 5,561,756 A | 10/1996 | Miller et al. | |
| 5,579,456 A * | 11/1996 | Cosman | 345/419 |
| 5,706,481 A * | 1/1998 | Hannah et al. | 345/519 |
| 5,739,818 A | 4/1998 | Spackman | |
| 5,805,782 A | 9/1998 | Foran | |
| 5,943,058 A | 8/1999 | Nagy | |
| 5,973,701 A | 10/1999 | Vaswani | |
| 6,005,582 A | 12/1999 | Gabriel et al. | |
| 6,037,949 A | 3/2000 | DeRose et al. | |
| 6,078,332 A | 6/2000 | Ohazama | |
| 6,163,320 A | 12/2000 | Barcena et al. | |
| 6,169,553 B1 | 1/2001 | Fuller et al. | |
| 6,181,348 B1 * | 1/2001 | Geiger | 345/583 |
| 6,229,547 B1 | 5/2001 | Grzeszcuk | |
| 6,232,979 B1 | 5/2001 | Shochet | |
| 6,288,730 B1 | 9/2001 | Duluk, Jr. et al. | |
| 6,297,833 B1 * | 10/2001 | Ho et al. | 345/581 |
| 6,348,917 B1 | 2/2002 | Vaswani | |
| 6,462,747 B1 | 10/2002 | Oh | |
| 6,664,958 B1 * | 12/2003 | Leather et al. | 345/422 |

FOREIGN PATENT DOCUMENTS

WO    WO 01/71668    9/2001

OTHER PUBLICATIONS

Horton, et al, U.S. Patent Application entitled, "System and Method for Resampling Texture Maps," filed Feb. 9, 2006.
Horton, et al. U.S. Appl. No. 10/365,975, entitled, "System and Method for Resampling Texture Maps," filed Feb. 13, 2003.

* cited by examiner

*Primary Examiner*—M Good Johnson

(57) ABSTRACT

A system for resampling texture maps in accordance with an exemplary embodiment of the present invention comprises memory and a texture map manager. The stores a first texture map defining a first texture, and the first texture map is based on an image of an object. The texture map manager is configured to resample the first texture map such that resampling of the first texture map, by the texture map manager, compensates for a surface distortion of the object.

14 Claims, 17 Drawing Sheets

(Side View)

(Bottom View)

(Side View)

(Top View)

SYSTEM AND METHOD FOR RESAMPLING TEXTURE MAPS

BACKGROUND OF THE INVENTION

Related Art

Texture mapping typically involves mapping a source image, referred to as a "texture," onto a surface of a graphical object. The texture is normally defined by a texture map having a plurality of point elements, referred to as "texels." Each texel comprises one or more color component values and a set of texel coordinates. Each color component value is indicative of one of the texel's color components (e.g. red, green, or blue), and the texel coordinates are indicative of the texel's position within the texture.

During texture mapping, a texture mapper receives graphical data (e.g., primitives) defining a surface of a graphical object, and the texture mapper maps the pixels of the object's surface to the texels of the texture map. In this regard, based on a pixel's coordinate values, the texture mapper maps the pixel to one or more corresponding texels of the texture map. If there is only one corresponding texel, then the texture mapper assigns the color component values of the one corresponding texel to the pixel. If there are multiple corresponding texels, then the texture mapper interpolates color component values from the color component values of the corresponding texels and then assigns the interpolated color component values to the pixel. The color component values assigned to the different pixels by the texture mapper are then utilized to color the object's surface when the object is displayed by a display device, such as a display monitor or a printer, for example. Moreover, the surface of the displayed object appears to have a texture that corresponds to the source image defined by the aforedescribed texture map.

Employing texture mapping generally facilitates the creation of more complex and realistic images. In this regard, when texture mapping techniques are employed, it is not necessary for the primitives of a graphical object to define the texture of the object's surface, thereby reducing the amount of graphical data included in the primitives. Thus, storage and processing of the primitives are generally facilitated. During rendering, a graphics adapter can take a texture map defining a small image of a complex texture and, using various techniques, such as tiling, for example, apply the texture to the surface of the graphical object such that the object's surface appears to be textured according to the source image defined by the texture map.

Indeed, utilizing conventional texture mapping techniques, graphical display systems have efficiently produced fairly realistic and complex images. However, techniques for further improving the textured appearance of graphical objects are generally desirable.

SUMMARY OF THE INVENTION

The present invention pertains to a system and method for resampling texture maps.

A system for resampling texture maps in accordance with an exemplary embodiment of the present invention comprises memory and a texture map manager. The stores a first texture map defining a first texture, and the first texture map is based on an image of an object. The texture map manager is configured to resample the first texture map such that resampling of the first texture map, by the texture map manager, compensates for a surface distortion of the object.

A method for resampling texture maps in accordance with an exemplary embodiment of the present invention comprises: defining a first texture via a first texture map, the first texture having a discontinuous edge, and resampling the first texture map thereby generating a second texture map that is based on the first texture map, wherein the second texture map defines a second texture having a continuous edge corresponding to the discontinuous edge of the first texture.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION

Graphical display systems are often used to generate simulated images of physical objects. However, some physical objects possess certain characteristics that are difficult for a graphical display system to accurately simulate. For example, an. object sometimes has a surface that does not appear to respond to changes in light directions in a homogenous fashion across the object's surface. More specifically, the luminosity of one point on an object's surface may appear to behave differently, based on light position, than the luminosity of another point on the object's surface.

For example, if a light source is positioned at an angle ($\alpha$) relative to a first point on the object's surface and is moved to an angle ($\beta$) relative to the first point, the luminosity of the first point may appear to change in a particular manner as the light source is being moved from angle ($\alpha$) to angle ($\beta$). However, if the light source is positioned at the same angle ($\alpha$) relative to a second point on the object's surface and is moved to the same angle ($\beta$) relative to the second point, the luminosity of the second point may appear to change in an entirely different manner as the light source is being moved from angle ($\alpha$) to angle ($\beta$).

Such a phenomena is not always noticeable to a viewer and is often more pronounced for less homogenous surfaces. As an example, many cloth fabrics have several different threads of different sizes and colors interwoven together and, as a result, have a surface that is substantially non-homogenous. Moreover, the luminosity behavior of objects covered with such cloth material often appears to change as the position of the light source illuminating the objects changes.

Conventional texture mapping systems typically do not attempt to account for the aforedescribed phenomena when applying a texture to a surface of a graphical object. In this regard, typical texel values in a conventional texture map are constant color values and, in particular, do not account for the fact that different texels of a texture defined by the texture map may, in reality, appear to respond to light in a different manner than other texels. A texture mapping system in accordance with a preferred embodiment of the present invention, on the other hand, accounts for the phenomena that different texels of the texture defined by a texture map may appear to respond to light in a different manner as a light source is moved relative to the texels. Thus, more realistic graphical images are possible.

Figure 1:
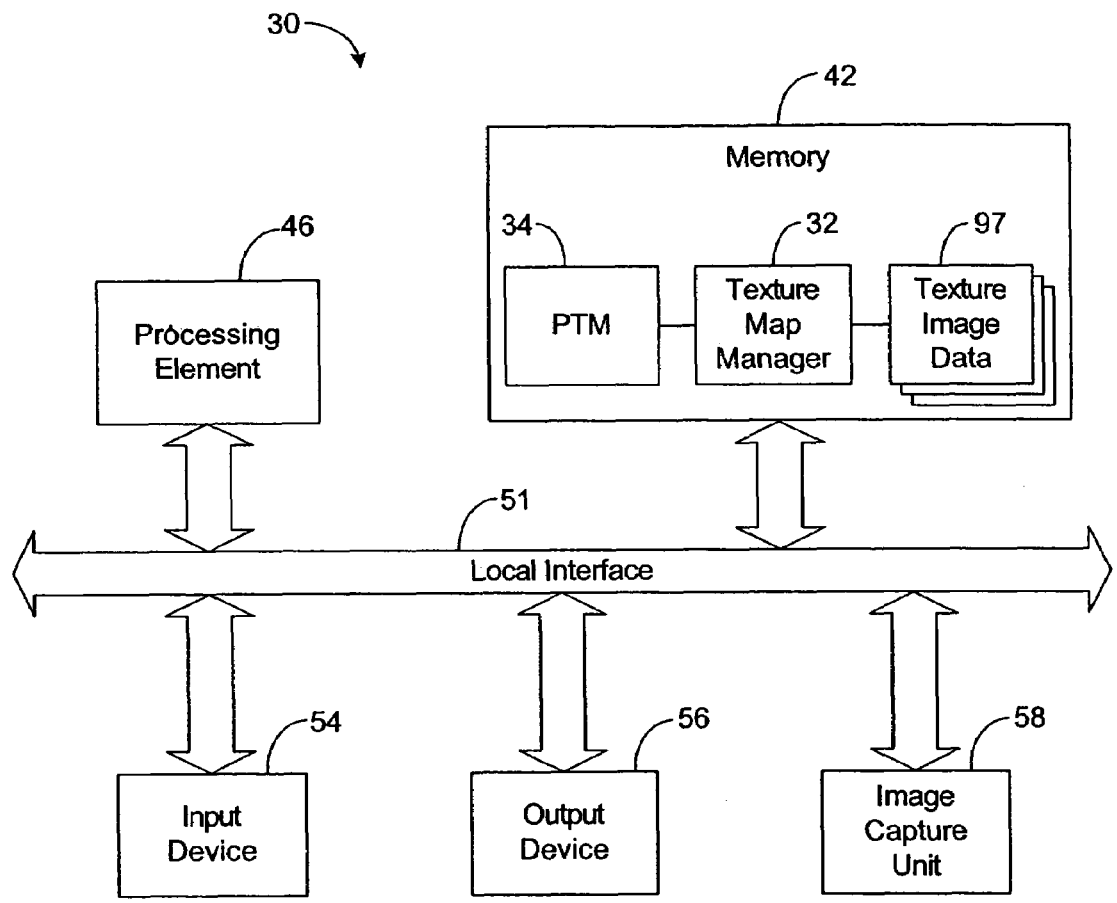
FIG. 1 is a block diagram illustrating an exemplary embodiment of a texture map generating and editing system.

In this regard, FIG. 1 depicts a texture map generating and editing system 30 in accordance with a preferred embodiment of the present invention. As shown by FIG. 1, the system 30 preferably comprises a texture map manager 32 for generating and editing a parametric texture map (PTM) 34. As will be described in more detail hereafter, each texel of the PTM 34 preferably comprises a polynomial texture equation that allows the texel's luminosity value to be calculated as a function of light position or some other parameter. As used herein, a texel's "luminosity value" refers to a value indicative of at least the texel's brightness. In this regard, a texel's luminosity value may only indicate brightness or may indicate another color parameter combined with the texel's brightness. For example, a luminosity value may be a value that is indicative of a texel's brightness, independent of the texel's color, or a luminosity value, in another example, may be a value indicative of both color and brightness.

Note that the texture map manager 32 can be implemented in software, hardware, or any combination thereof In a preferred embodiment, as illustrated by way of example in FIG. 1, the texture map manager 32, along with its associated methodology, is implemented in software and stored in memory 42 of the texture map generating and editing system 30.

Further note that the texture map manager 32, when implemented in software, can be stored and transported on any computer-readable medium for use by or in connection with an instruction execution system, apparatus, or device, such as a computer-based system, processor-containing system, or other system that can fetch and execute instructions. In the context of this document, a "computer-readable medium" can be any means that can contain, store, communicate, propagate, or transport a program for use by or in connection with the instruction execution system, apparatus, or device. The computer readable-medium can be, for example but not limited to, an electronic, magnetic, optical, electromagnetic, infrared, or semiconductor system, apparatus, device, or propagation medium. Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the texture map manager 32 may be magnetically stored and transported on a conventional portable computer diskette.

The graphical display system 30 of FIG. 1 comprises one or more conventional processing elements 46, such as a digital signal processor (DSP) or a central processing unit (CPU), that communicate to and drive the other elements within the system 30 via a local interface 51, which can include one or more buses. Furthermore, an input device 54, for example, a keyboard or a mouse, can be used to input data from a user of the system 30, and an output device 56, for example, a screen display or a printer, can be used to output data to the user.

In a preferred embodiment, the texture map manager 32 controls an image capture unit 58 for capturing a plurality of images of an object. As will be described in more detail below, for each captured image, the object is preferably lit by a light source from a different direction. The texture map manager 32 preferably analyzes the captured images to generate the PTM 34. Each texel of the PTM 34 may comprise color component values, which each represent one of the texel's color components. In the preferred embodiment, each texel comprises red (R), green (G), and blue (B) color component values, although color components other than red, green, and blue may be utilized in other embodiments.

In addition to the color component values, each texel also may comprise data defining a polynomial texture equation, also referred to herein as a "luminosity equation," representing the texel's luminosity behavior as a function of light direction. As will be described in more detail below, each luminosity equation is preferably based on a measure of luminosity values at a corresponding pixel of the captured images.

In this regard, each texel preferably corresponds to a particular set of pixel coordinates of the captured images. Further, to determine a polynomial texture equation for a texel, the texture map manager 32 may determine, for each of the captured images, the luminosity value of the pixel at the texel's corresponding set of coordinates. The determined luminosity values, referred to as "sample luminosity values," may indicate both color and brightness and may be averaged together to determine the texel's color component values. In this regard, the red, green, and blue color component values (R, G, and B) assigned to the texel may respectively correspond to the red, green, and blue color components of the averaged luminosity value (i.e., the value averaged from the sample luminosity values). Furthermore, based on the foregoing sample luminosity values, the texture map manager 32 also may determine the texel's polynomial texture equation as a function of light position.

Such a polynomial texture equation preferably represents the luminosity behavior of the texel as the position of a light source illuminating the texel changes. Note that the polynomial texture equations of different texels may be different, thereby enabling the texture map manager 32 to establish a different luminosity behavior for different texels. Indeed, by assigning different texture equations to different texels, the manager 32 is able to account for the phenomena that different points of a non-homogenous surface may appear to respond differently to changes in light direction. As a result, a more realistic image of a graphical object may be produced when the PTM 34 is applied to the object's surface.

An exemplary methodology for generating the PTM 34 will now be described in more detail. In this regard, the image capture unit 58, operating under the direction and control of the texture map manager 32, preferably captures a plurality of images of a sample object, such as a piece of fabric, for example. As will be described in more detail hereafter, each of the images is preferably captured when the sample object is being lit from a different direction.

Figure 2:
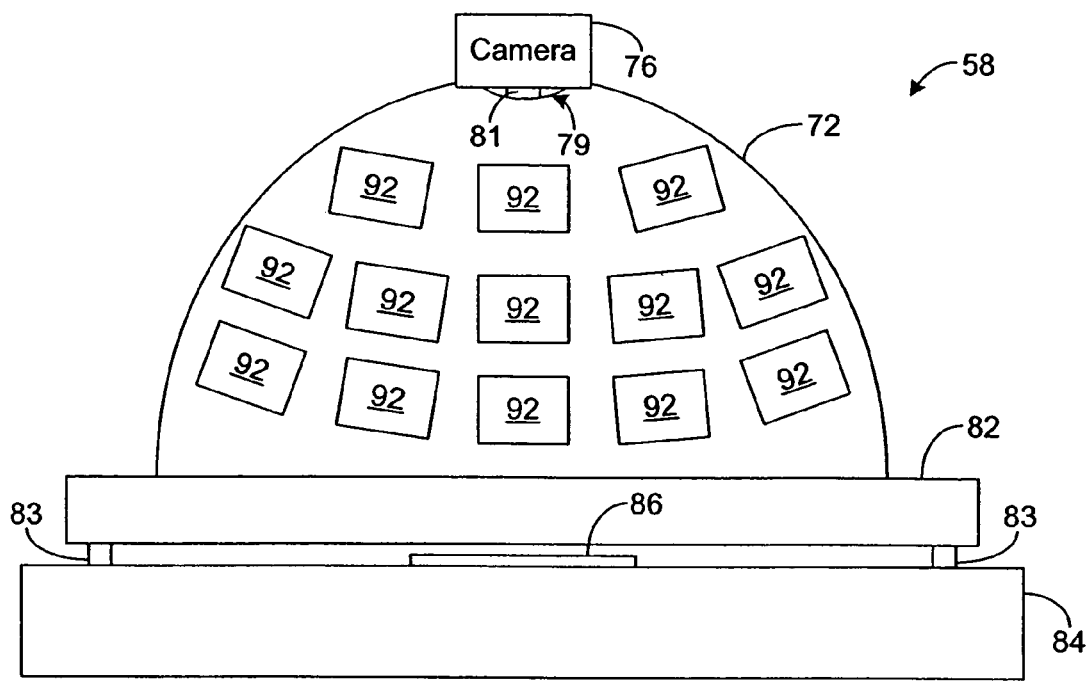
FIG. 2 is a diagram illustrating a side view of an image capture unit, such as is depicted in FIG. 2.
Figure 3:
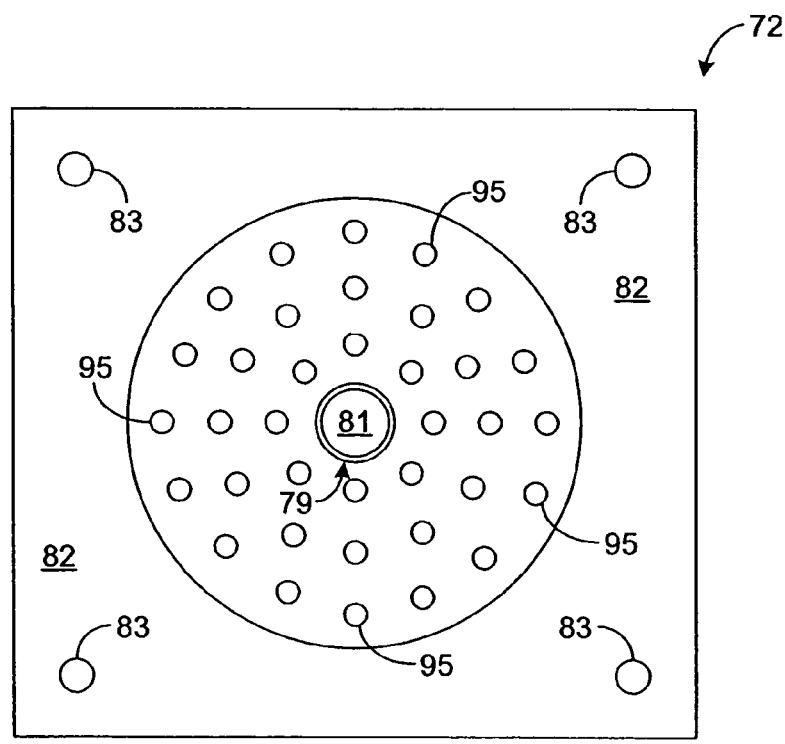
FIG. 3 is a diagram illustrating a bottom view of an image capture unit, such as is depicted in FIG. 2.

FIGS. 2 and 3 depict an exemplary image capture unit 58 that may be utilized to capture images of the sample object 86. In this exemplary embodiment, the image capture unit 58 comprises a dome structure 72 having a digital camera 76 mounted at the top of the structure 72, as shown by FIGS. 2 and 3, although other types of structures may be employed for mounting the camera 76 in other embodiments. In the embodiment depicted by FIGS. 2 and 3, the dome structure 72 has a hole 79 through which a lens 81 of the camera 76 can receive light from the interior of the dome structure 72. Furthermore, the dome structure 72 of FIG. 2 preferably has a base 82 coupled to a plurality of legs 83 for supporting the structure 72 when the structure 72 is placed on another base or structure 84, such as a table or desk, for example. In a preferred embodiment, the length and width of the base 82 is approximately 2.5 feet by 2.5 feet, and the height of the structure 72 is approximately 1.25 feet, although other dimensions of the structure 72 are possible in other embodiments.

A sample object 86 is preferably positioned underneath the dome structure 72, and the lens 81 of the camera 76 preferably points to and is focused on the sample object 86 such that the camera 76 automatically captures an image of the sample object 86 when the camera 76 is instructed to take a picture. As an example, the sample object 86 may be placed on the same structure 84 upon which the dome structure 72 is residing and may be positioned at the center of the structure 72 such that the sample object 86 is directly below the hole 79 and lens 81.

Figure 4:
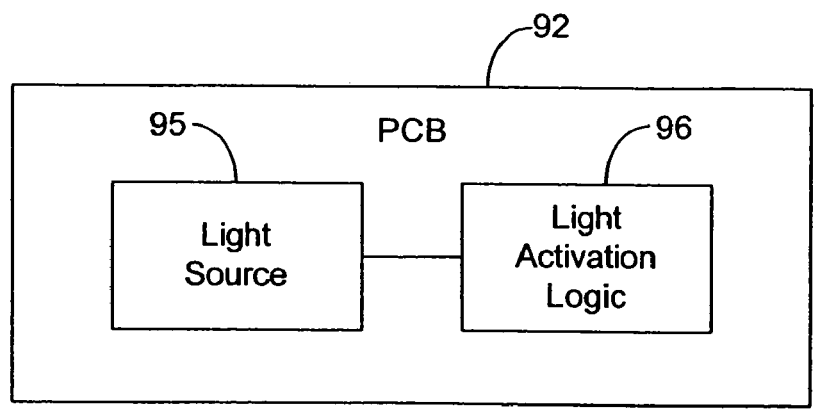
FIG. 4 is a block diagram illustrating a printed circuit board, such as is depicted in FIG. 2.

In the embodiment depicted by FIG. 2, a plurality of printed circuit boards (PCBs) 92 are mounted on the exterior of the dome structure 52. As shown by FIG. 4, each of the PCBs 92 preferably comprises a light source 95 (e.g., a light bulb, a light emitting diode, etc.) and light activation logic 96 for selectively activating and deactivating the light source 95 based on commands from the texture map manager 32. The light source 95 of each PCB 92 preferably extends through the dome structure 72 and is exposed to the interior of the dome structure 72, as shown by FIG. 3, such that light emitted from-each of the light sources 95 illuminates the sample object 86. Each of the PCBs 92 and the camera 76 are preferably communicatively coupled to the local interface 51 (FIG. 1) and can exchange data with the texture map manager 32.

In an image capture phase, the texture map manager 32 periodically transmits, to the camera 76, a command for causing the camera 76 to capture an image of the sample object 86. The images captured by the camera 76 are preferably used to generate the PTM 34 and will be referred to hereafter as "texture images." Furthermore, the command transmitted by the texture map manager 32 for causing the camera 76 to capture a texture image will be referred to hereafter as a "capture image command."

For each capture image command, the texture map manager 32 also transmits, to a different one of the PCBs 92, a command for causing the PCB's logic 96 to activate its corresponding light source 95. Such a command will be referred to hereafter as an "activation command." In response to an activation command, the PCB's logic 96 temporarily activates its corresponding light source 95 causing the light source 95 to flash light that briefly illuminates the sample object 86. The texture map manager 32 preferably controls the timing of the capture image command and the activation command such that the sample object 86 is being illuminated by the light source 95 when the camera 76 captures an image of the sample object 86.

Note that the texture map manager 32 preferably transmits a capture image command and an activation command for each PCB 92. Accordingly, each captured texture image corresponds to an image of the sample object 86 as the sample object 86 is being illuminated by a different one of the light sources 95 and, therefore, from a different direction. Note that the location of each light source 95 may be fixed, and for each texture image, the texture map manager 32 is preferably aware of the angle of incidence of the light that is illuminating the sample object 86. In this regard, the angle of incidence of light from each light source 95 on the sample object 86 may be measured and programmed into the texture map manager 32.

Each texture image captured by the camera 76 is preferably stored in the memory 42 (FIG. 1) of the texture map generating and editing system 30 as a set of texture image data 97. After the texture images are captured, the texture map manager 32 preferably analyzes the texture image data 97 and generates the PTM 34 based on the data 97. More specifically, the texture map manager 32, utilizing known or future-developed techniques, measures or otherwise determines the color of each pixel of each texture image defined by the data 97. The texture map manager 32 may then utilize the measured color values to derive color component values and/or luminosity equations for the texels of the PTM 34.

In this regard, the camera 76 and the sample object 86 preferably remain in a fixed position as the texture images are being captured during the image capture phase. Thus, pixels at the same set of coordinates for different texture images correspond to the same region or point on the sample object's surface. Moreover, each set of coordinates preferably corresponds to a different texel. Furthermore, to determine the color component values for a particular texel of the texture map 34, the texture map manager 32, for each texture image, determines the pixel's luminosity value (e.g., a value indicative of the pixel's color and brightness) at the set of coordinates that correspond to the particular texel. This may be achieved, for example, by identifying the particular set of coordinates for the texel and then retrieving, from each of the texture images, the luminosity value measured for the image's pixel that is located at or mapped to the identified set of coordinates. The manager 32 then averages the retrieved luminosity values to determine an averaged luminosity value for the particular texel. Values indicative of the color components of this averaged value are then utilized as the color component values (R, G, and B) for the particular texel.

To determine the luminosity equation for the particular texel, the texture map manager 32, for each texture image, preferably plots a luminosity value associated with the texel's corresponding set of coordinates. This may be achieved, for example, by identifying the particular set of coordinates for the texel and then retrieving, from each of the texture images, the luminosity value measured for the image's pixel that is located at the identified set of coordinates, as described above for determining the color component values. Each retrieved luminosity value may then be divided by the aforementioned averaged color value to derive a luminosity value (L) that is independent of the pixel's color. This luminosity value (L) may then be plotted as a function of the angle of incidence associated with the retrieved luminosity value.

Figure 5:
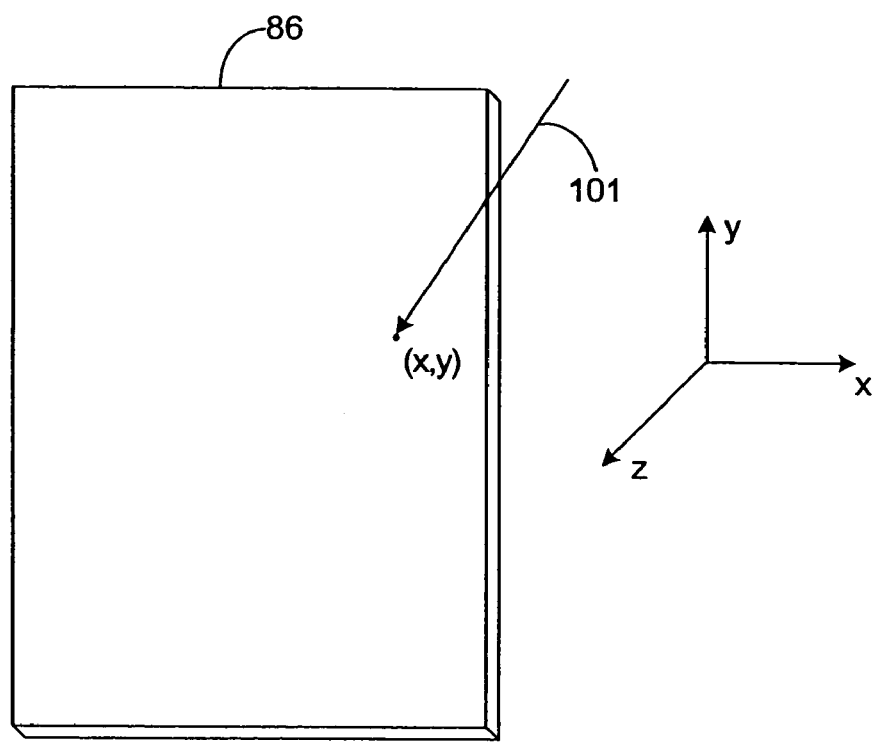
FIG. 5 is a diagram illustrating a three-dimensional view of a sample object that may be positioned underneath a dome structure of an image capture unit, such as is depicted in FIG. 2.
Figure 6:
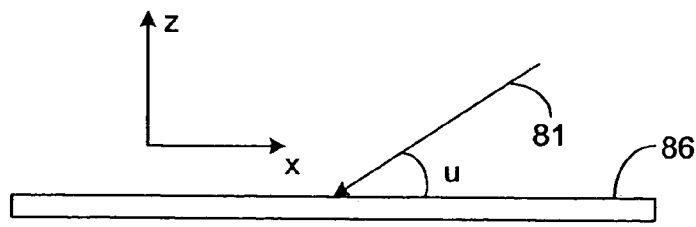
FIG. 6 is a diagram illustrating a side view of the sample object depicted in FIG. 5.
Figure 7:
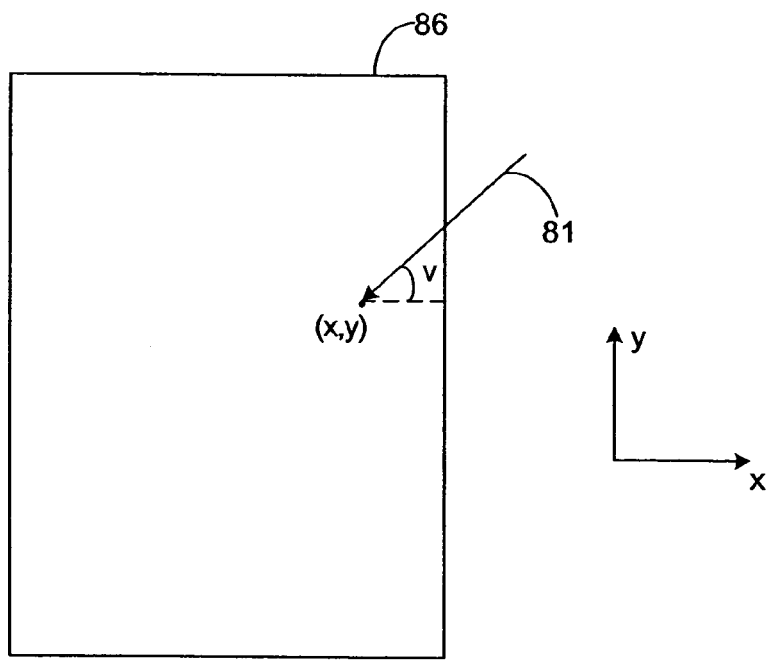
FIG. 7 is a diagram illustrating a top view of the sample object depicted in FIG. 5.

To better illustrate the plotting described above, assume that a texel associated with or mapped to coordinates (x,y) of the sample object 86 is selected. FIG. 5 depicts the sample object 86 wherein an arrow 101 represents the direction of light illuminating the object 86 when the camera 76 (FIG. 2) is capturing one of the texture images defined by the texture data 97 (FIG. 1). In particular, the arrow 101 indicates the direction from which the light source 95 illuminating the object 86 is positioned relative to the object 86. Note that the angle of incidence of the light illuminating the object 86 has two angular components, a "u" component and a "v" component. Each of these components is depicted in FIGS. 6 and 7, respectively.

Figure 8:
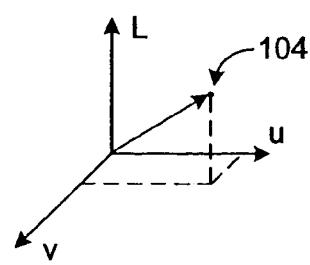
FIG. 8 is a diagram illustrating a three dimensional plot of a data point indicative of a measured luminosity value and an angle of incidence for a texel of an image of the sample object depicted in FIG. 5.

Moreover, for the texture image captured in this example, angular components (u) and (v) are known values, and the pixel at coordinates (x,y) is associated, by the set of image data 97 defining the captured image, with a measured luminosity value ($L_{measured}$). The measured luminosity value ($L_{measured}$) may be converted into a luminosity value (L) that is indicative of brightness only by dividing the measured luminosity value ($L_{measured}$) by an averaged luminosity value representing the average color of the pixel in the different images defined by the data 97. After determining the foregoing luminosity value (L), a three dimensional plot of (L, u, and v) can be performed, as shown by FIG. 8, in which point 104 represents the plotted value. In a preferred embodiment, such a plot is made for the same pixel (i.e., the pixel at the same set of coordinates) of each texture image captured during the image capture phase.

After performing a plot for the same pixel of each texture image, as described above, the texture map manager 32 preferably fits a three-dimensional curve (which represents an approximation of (L) as a function of (u) and (v)) to the plotted points. In a preferred embodiment, the well-known least squares approximation is employed by the texture map manager 32 to perform a curve fit, although other techniques for curve fitting may be performed in other embodiments. The texture map manager 32 also preferably derives an equation representing the fitted curve or, in other words, representing an approximation of (L). In the preferred embodiment where least squares approximation is utilized for curve fitting, the resulting equation derived by the manager 32 is a bi-quadratic polynomial represented as:

$$L=F(u,v)=Au^2+Bv^2+Cuv+Du+Ev+F,$$

where (A, B, C, D, E, and F) are all constants and where (u) and (v) are variables. Note that this equation is representative of the luminosity behavior of the selected texel (i.e., the texel associated with coordinates (x,y)) as a function of (u) and (v), which are angular components of the texel's angle of incidence. Data defining the texel's luminosity equation is preferably stored in memory 42 as a portion of the PTM 34. Moreover, the aforementioned techniques are preferably repeated for each texel such that a luminosity equation, in addition to a set of color component values (R, G, and B), is derived and stored for each texel of the PTM 34.

It is often desirable for the texture defined by the PTM 34 to be rectangular or some other symmetrical or uniform shape in order to facilitate various texture mapping techniques, such as tiling, for example. Furthermore, according to the texture map generation techniques described above, the shape of the texture defined by the PTM 34 generally corresponds to the shape of the sample object 86 on which the PTM 34 is based. Thus, in order to generate a PTM 34 defining a texture of a particular shape, a user may utilize a sample object 86 that exhibits the same particular shape. For example, to generate a rectangular texture, a user may utilize a rectangular sample object 86 and cause the system 30 to generate a PTM 34 based on the rectangular object 86 according to the techniques described above.

However, in some instances, the shape of the sample object 86 may become stretched, warped, or otherwise distorted resulting in a PTM 34 that defines a texture of an undesirable shape (e.g., a shape that is not easily tiled). In such instances, the texture map manager 32 may be configured to resample the PTM 34 in order to define a new PTM 34 that defines a texture of a more desirable shape.

Further, stretching, warping, or otherwise distorting the shape of the sample object 86 often causes surface distortions that affect the luminosity of the object's surface. As an example, when a piece of fabric is stretched, the individual threads making up the fabric may be spread apart. Furthermore, depending on the extent of the stretching, the amount that the individual threads are pulled apart may vary over the surface of the fabric. As a result, a stretched piece of fabric may exhibit a slightly different luminosity behavior as compared to the luminosity behavior of the fabric prior to the stretching.

Moreover, when the texture map manager 32 resamples the PTM 34 in order to generate a new PTM 34 defining a texture of a more desirable shape, the texture map manager 32 preferably uses a resampling algorithm that helps to compensate for the effect of surface distortions on the luminosity behavior of the sample object 86. In this regard, the texture map manager 32 preferably resamples the PTM 34 such that the new PTM 34 defines a luminosity behavior that more closely resembles the luminosity behavior of the sample object 86 had the object 86 not been subjected to stretching, warping, or other types of distorting. An exemplary resampling algorithm for achieving the foregoing is described in further detail below.

Figure 9:
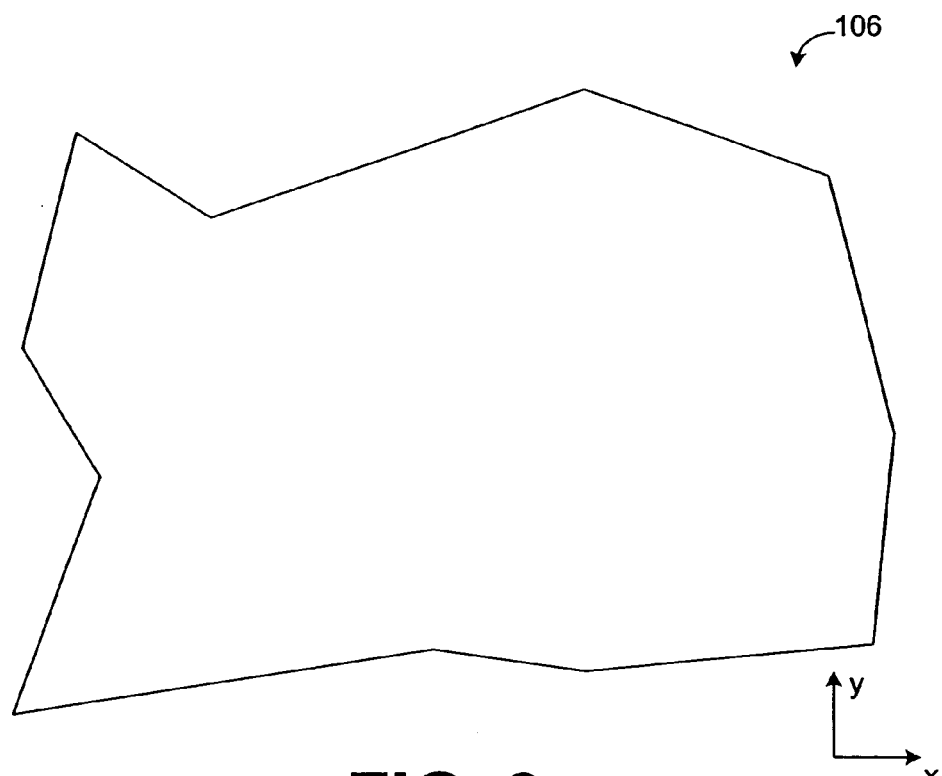
FIG. 9 is a diagram illustrating an exemplary texture that may be defined by a parametric texture map (PTM) generated by a texture map generating and editing system, such as is depicted in FIG. 1.
Figure 10:
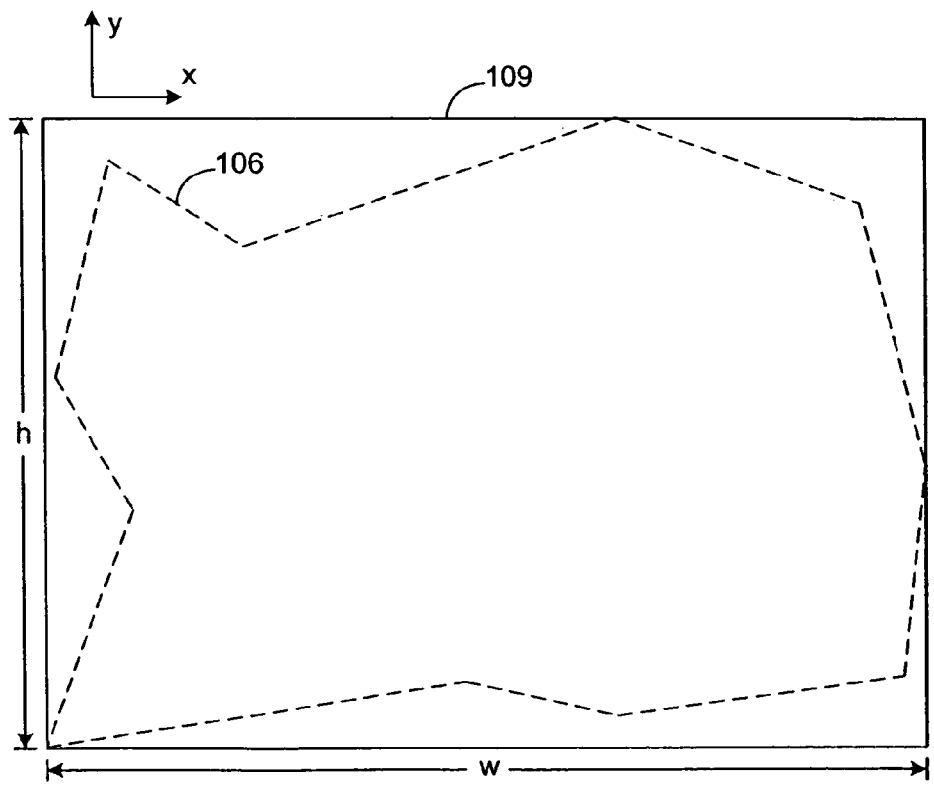
FIG. 10 is a diagram illustrating a comparison of the texture depicted in FIG. 9 to a new texture that may be derived from the texture of FIG. 9 by a texture map generating and editing system, such as is depicted in FIG. 1.

In this regard, assume that a PTM 34 generated by the texture map generating and editing system 30 defines a texture 106 depicted by FIG. 9. As shown by FIG. 9, the texture 106 is asymmetric, due perhaps to stretching or warping of the sample object 86, making the texture 106 difficult to tile. In such an example, the texture map manager 32 may be configured to resample the PTM 34 in order to define a new texture of a more desirable shape. For example, the texture map manager 32 may be configured to resample the PTM 34 such that asymmetrical opposing edges (e.g., upper and lower edges or left and right edges) of the texture defined by the PTM 34 are transformed into symmetrical opposing edges (i.e., opposing edges having corresponding or similar shapes with respect to each other), thereby facilitating texture processing techniques, such as tiling. For illustrative purposes, assume that the texture map manager 32 is configured to resample the PTM 34 to define a texture having parallel opposing edges or, more particularly, to define a rectangular texture, such as the texture 109 depicted in FIG. 10.

Both the textures 106 and 109 preferably comprise columns and rows of texels. In this regard, a "column" corresponds to a line of texels parallel to the y-direction, and a "row" corresponds to a line of texels parallel to the x-direction. Further, as described above, each texel of the texture 106 may be defined by color component values (R, G, and B) and a luminosity equation (L). In a preferred embodiment, each luminosity equation (L) may comprise a unique set of constants (A, B, C, D, E, and F), as previously described above. In defining the PtM 34 of the new texture 109, the texture map manager 32 is preferably configured to define new color component values and a new luminosity equation for each texel of the new texture 109 based on the color component values and the luminosity equation of one or more corresponding texels in the original texture 106. More particularly, the new color component values (R, G, and B) and the constants (A, B, C, D, E, and F) for each new luminosity equation of the new texture 109 are respectively interpolated from the color component values (R, G, and B) and the constants (A, B, C, D, E, and F) of luminosity equations for one or more corresponding texels in the original texture 106.

Note that there are various methodologies that may be employed to derive the color component values and the luminosity equations of the new texture 109 from the color component values and the luminosity equations of the original texture 106. An exemplary methodology for deriving the color component values and the luminosity equations of the new texture 109 will now be described in more detail.

In this regard, assume that, as described above, each texel of the original texture 106 is associated with and defined by a set of color component values (R, G, and B) and a single luminosity equation (L) expressed as:

$$L = F(u, v) = Au^2 + Bv^2 + Cuv + Du + Ev + F,$$

where (A, B, C, D, E, and F) are constants and where (u) and (v) are variables representing the angular components of light that is illuminating the associated texel. Initially, the width and height of the new texture 109 are preferably determined by the texture map manager 32, as depicted by block 110 of FIG. 11. In a preferred embodiment, the width (w) of the new texture 109 corresponds to the horizontal distance between the left-most texel (i.e., the texel with the lowest x-position value) and right-most texel (i.e., the texel with the highest x-position value) of the original texture 106, and the height (h) of the new-texture 109 corresponds to the vertical distance between the highest texel (i.e., the texel with the highest y-position value) and the lowest texel (i.e., the texel with the lowest y-position value) of the original texture 106. Note that other widths and/or heights for the new texture 109 are possible in other embodiments.

Figure 11:
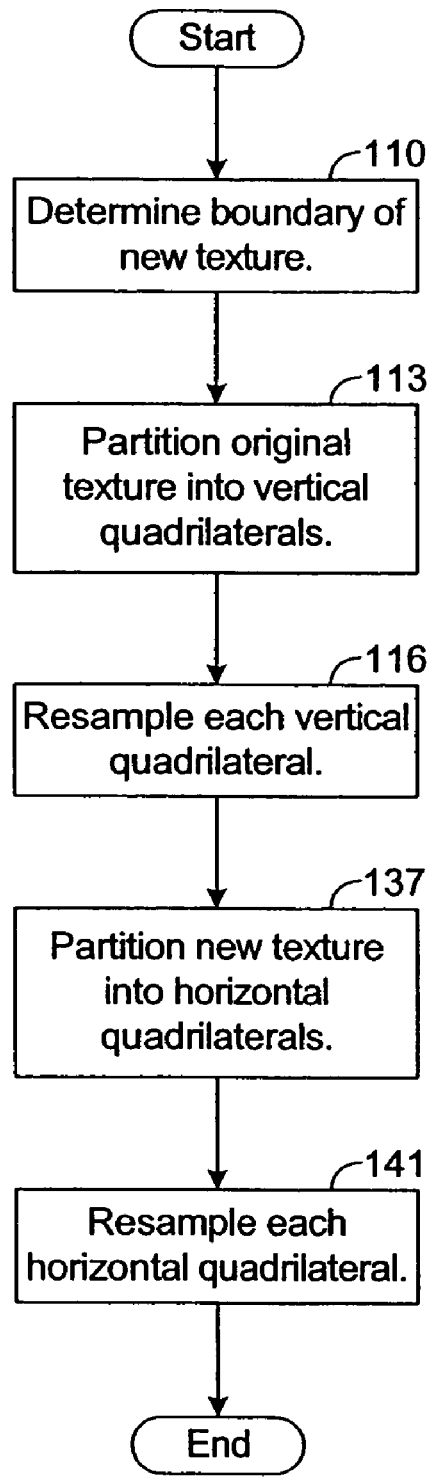
FIG. 11 is a flow chart depicting an exemplary process for resampling a texture map.

The texture map manager 32 preferably partitions the original texture 106 into vertical quadrilaterals 111 (FIG. 12), as shown by block 113 of FIG. 11. This is preferably achieved by first identifying discontinuity points 112 along the top edge 114 of the texture 106 and discontinuity points 11 5 along the bottom edge 117 of the texture 106. As used herein, a "discontinuity point" of an edge refers to a point where the slope or rate of directional change of the edge substantially changes. Note that an edge having at least one discontinuity point between the ends of the edge shall be referred to herein as a "discontinuous edge," and an edge having no discontinuity points (ie., a straight edge) between the ends of the edge shall be referred to herein as a "continuous edge."

Figure 12:
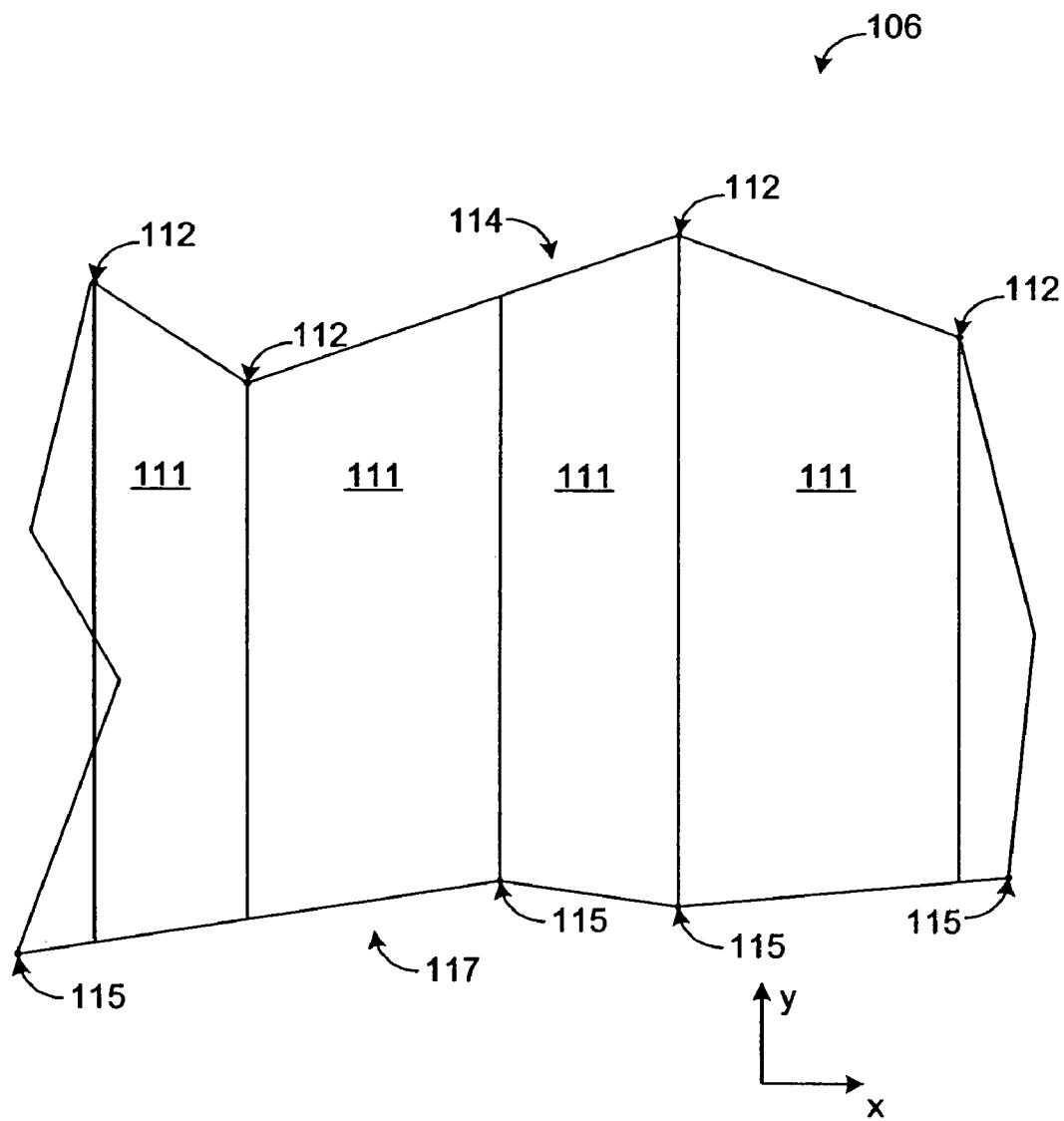
FIG. 12 is a diagram of the texture depicted in FIG. 9 once the texture has been partitioned into vertical quadrilaterals by a texture map manager, such as is depicted in FIG.1.

As shown by FIG. 12, the texture 106 is preferably partitioned such that each vertical quadrilateral 111 comprises two parallel vertical sides (i.e., sides parallel to the y-direction) with each such vertical side positioned at a point of discontinuity 112 or 115. Note that except for the left-most and right-most discontinuity points, a vertical side of one of the vertical quadrilaterals 111 is preferably positioned at each discontinuity point 112 and 115.

Figure 13:
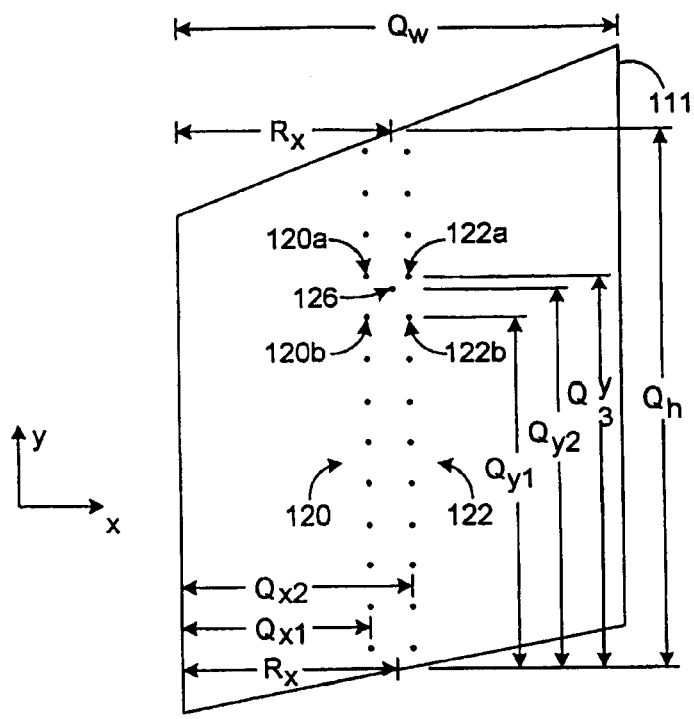
FIG. 13 is a diagram illustrating a vertical quadrilateral, such as is depicted in FIG. 12.
Figure 14:
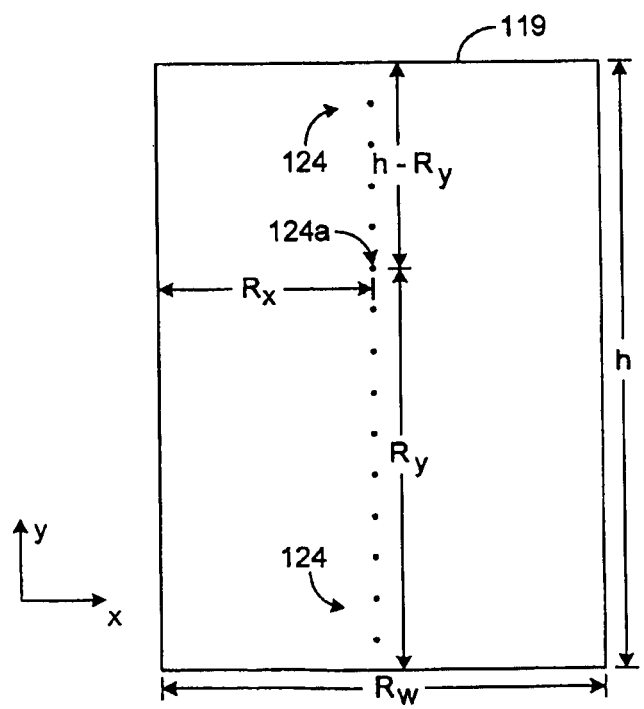
FIG. 14 is diagram illustrating a rectangle that may be derived from the vertical quadrilateral of FIG. 13 by a texture map manager, such as is depicted in FIG. 1.

After partitioning the original texture 106 into vertical quadrilaterals 111, as described above, the texture map manager 32 resamples each of the vertical quadrilaterals 111l1 into a rectangle having a height corresponding to the height of the new texture 109 (FIG. 10), as shown by block 116 of FIG. 11. For example, FIG. 13 depicts one of the vertical quadrilaterals 111 of the original texture 106, and FIG. 14 depicts a rectangle 119 derived via resampling of the quadrilateral III of FIG. 13. Note that the width ($Q_w$) of the quadrilateral 111 preferably equals the width ($R_w$) of the rectangle 119.

Furthermore, the x-position of each column of texels in the rectangle 119 may either coincide with the x-position of one of the columns of texels in the vertical quadrilateral 111 or may fall between the x-positions of two adjacent columns of texels in the vertical quadrilateral 111. In this regard, assume that a column 120 of texels in the quadrilateral 111 comprises at least a pair of texels 120a and 120b and that another column 122 of texels in the quadrilateral 111 comprises at least a pair of texels 122a and 122b, as shown by FIG. 13. Further assume that, as shown by FIG. 14, a column 124 of texels in the rectangle 119 comprises at least texel 124a.

In such an example, the column 124 coincides with the column 120 if the x-position of the column 120 matches the x-position of the column 124. Note that, when this occurs, the distance ($Q_{x1}$) of the column 120 from the left-most edge of the quadrilateral 111 equals the distance ($R_x$) of the column 124 from the left-most edge of the rectangle 119. Furthermore, the column 124 falls between two adjacent columns 120 and 122 when the x-position of the column 124 falls between the respective x-positions of the adjacent columns 120 and 122. Note that, when this occurs, the distance ($R_x$) is greater than the distance ($Q_{x1}$) but less than the distance ($Q_{x2}$) of the adjacent column 122.

In a preferred embodiment, the texture map manager 32 is configured to determine the luminosity equation (L) of each texel in the new texture 109 based on the luminosity equation or equations of one or more texels in the original texture 106. As an example, to determine the luminosity equation (L) of the texel 124a, the texture map manager 32 determines the distance that the texel 124a is from the top of the rectangle 119 as a percentage of the height of the rectangle 119. For example, if the texel 124a is located in the middle of the column 124, then the texel's distance from the rectangle's top is 0.5(h), where "h" represents the rectangle's height or, in other words, the separation distance between the upper and lower edges. If the texel 124a is two-thirds of the way up the column 124, then the texel's distance from the rectangle's top is 0.333(h).

After determining the distance of the texel 124a from the rectangle's top, the texture map manager 32 correlates the texel 124a with a location 126 in the quadrilateral 111. In this regard, the manager 32 correlates the texel 124a with the location 126 that is (1) at the same x-position (i.e., the same distance from the quadrilateral's left-most edge as is texel 124a from the rectangle's left-most edge) and (2) the same distance, as a percentage of the quadrilateril's height ($Q_h$), from the quadrilateral's top.

For example, if the texel 124a is located two-thirds up the column 124, then the manager 32 first determines the height ($Q_h$) of the quadrilateral 111 at the same x-position (i.e., at a distance equal to ($R_x$) from the left-most edge of the quadrilateral 111). The manager 32 then correlates the texel 124a with the location 126 that is located a distance ($R_x$) from the left-most edge of the quadrilateral 111 and that is located a distance $0.333(Q_h)$ from the top edge of the quadrilateral 111. Note that this distance may be calculated from the following set of equations:

$$h - R_y = x(h); \text{ and}$$

$$Q_h - Q_{y2} = x(Q_h),$$

where (h) represents the height of the rectangle 119, ($R_y$) represents the vertical distance from the bottom of the rectangle to texel 124a, ($Q_h$) represents the height of the quadrilateral 111 at the x-position of the correlated location 126, ($Q_{y2}$) represents the vertical distance from the bottom of the quadrilateral 111 to the correlated location, and where (x) is a variable. The location 126 correlated with the texel 124a will be referred to hereafter as the "correlated location 126."

After identifying the correlated location 126, the texture map manager 32 preferably interpolates a luminosity equation for the correlated location 126 based on the luminosity equations of the adjacent texels of the quadrilateral 111, and the manager 32 then assigns this interpolated luminosity equation to the texel 124a. In this regard, if the correlated location 126 resides at the same x-position as column 120 (i.e., if ($R_x$) equals ($Q_{x1}$)), then the manager 32 interpolates a luminosity equation (L) for the texel 124a based on the luminosity equations of the two nearest (with respect to the correlated location 126) texels of the column 120.

For example, assume that the correlated location 126 is at the same x-position as the column 120 and falls between texels 120a and 120b (i.e., the distance ($Q_{y2}$) is greater than the distance ($Q_{y1}$) (FIG. 13) but less than the distance ($Q_{y3}$)). In such an example, the texture map manager 32 interpolates the constant (A) for the luminosity equation (L) assigned to the texel 124a based on a weighted average (weighted based on the distance of the correlated location 126 from the texels 120a and 120b) of the constant (A) for the luminosity equation of texel 120a and of the constant (A) for the luminosity equation of texel 120b. As an example, the interpolated constant (A) for the luminosity equation (L) of the texel 124a may be calculated based on the following equation:

$$A_{124a} = (d_{120a}/d_{total})A_{120a} + (d_{120b}/d_{total})A_{120b},$$

where ($A_{124a}$) represents the interpolated constant (A) for the luminosity equation of texel 124a, where ($A_{120a}$) represents the constant (A) for the luminosity equation of texel 120a, where ($A_{120b}$) represents the constant (A) for the luminosity equation of texel 120b, where ($d_{total}$) represents the total distance between texels 120a and 120b, where ($d_{120a}$) represents the distance between the correlated location 126 and texel 120a, and where ($d_{120b}$) represents the distance between the correlated location 126 and texel 120b.

Similarly, the texture map manager 32 may interpolate the constants (B, C, D, E, and F) for the luminosity equation of the texel 124a based on weighted averages of the constants (B, C, D, E, and F), respectively, for the luminosity equations of the texels 120a and 120b. After determining interpolated constant values (A, B, C, D, E, and F), the texture map manager 32 has enough information to define the luminosity equation of the texel 124a. Note that if the position of the correlated location 126 coincides with the location of a texel 120a, then the manager 32, according to the aforementioned techniques, preferably assigns the texel 124a a luminosity equation having the same constants (A, B, C, D, E, and F) as the luminosity equation of the texel 120a.

The texture map manager 32 may similarly interpolate the color component values (R, G, and B) for the texel 124a. As an example, the red color component value for the texel 124a may be calculated based on the following equation:

$$R_{124a} = (d_{120a}/d_{total})R_{120a} + (d_{120b}/d_{total})R_{120b},$$

where ($R_{124a}$) represents the interpolated red color component value for the texel 124a, where ($R_{120a}$) represents the red color component value for texel 120a, and where ($R_{120b}$) represents the red color component value for texel 120b. Similarly, the green and blue color component values for the texel 124a may be calculated based on the following equations:

$$G_{124a} = (d_{120a}/d_{total})G_{120a} + (d_{120b}/d_{total})G_{120b}; \text{ and}$$

$$B_{124a} = (d_{120a}/d_{total})B_{120a} + (d_{120b}/d_{total})B_{120b},$$

where ($G_{124a}$) represents the interpolated green color component value for the texel 124a, where ($G_{120a}$) represents the green color component value for texel 120a, where ($G_{120b}$) represents the green color component value for texel 120b, where ($B_{124a}$) represents the interpolated blue color component value for the texel, 124a, where ($B_{120a}$) represents the blue color component value for texel 120a, and where ($B_{120b}$) represents the blue color component value for texel 120b.

Moreover, if the x-position of the correlated location 126 instead falls between the columns 120 and 122 (i.e., if ($R_x$) is greater than ($Q_{x1}$) but less than ($Q_{x2}$)), then the manager 32 preferably interpolates a luminosity equation for the texel 124a based on the luminosity equations of the four nearest texels of the columns 120 and 122. For example, assume that the correlated location 126 falls within the region defined by texels 120a, 120b, 122a, and 122b (i.e., the distance ($Q_{y2}$) is greater than the distance ($Q_{y1}$) but less than the distance ($Q_{y3}$) and the distance ($R_x$) is greater than the distance ($Q_{x1}$) but less than the distance ($Q_{x2}$)). In such an example, the texture map manager 32 interpolates the constant (A) for the luminosity equation of the texel 124a based on a weighted average (weighted based on the distance of the correlated location 126 from the texels 120a, 120b, 122a, and 122b) of the constants A for each of the luminosity equations of texels 120a, 120b, 122a, and 122b. Similarly, the texture map manager 32 interpolates the constants (B, C, D, E, and F) for the luminosity equation of the texel 124a based on weighted averages of the constants (B, C, D, E, and F), respectively, for the luminosity equations of the texels 120a, 120b, 122a, and 122b. After determining interpolated constant values (A, B, C, D, E, and F), the texture map manager 32 has enough information to define the luminosity equation of the texel 124a.

Furthermore, in such an example, the texture map manager 32 respectively interpolates the color component values (R, G, and B) for the texel 124a based on weighted averages of the color component values (R, G, and B) for the texels 120a, 120b, 122a, and 122b. Note that the texture map manager 32 similarly calculates a luminosity equation (L) and a set of color component values (R, G, and B) for each texel of the rectangle 119.

Figure 15:
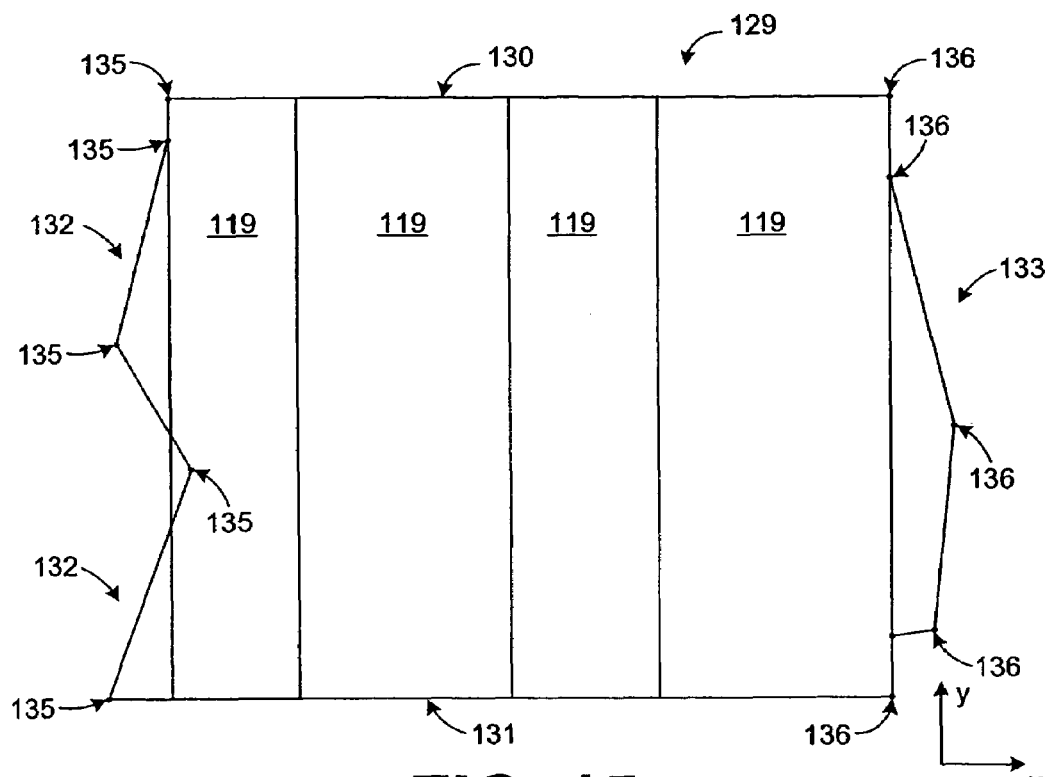
FIG. 15 is a diagram illustrating a texture that may be derived from the texture depicted in FIG. 12 by a texture map manager, such as is depicted in FIG. 1.

By defining a rectangle 119 for each vertical quadrilateral 111 of the texture 106, a texture 129 depicted by FIG. 15 may be defined. Note that by implementing the aforedescribed techniques, the top edge 130 and the bottom edge 131 of the texture 129 are preferably parallel to the x-direction. Furthermore, as shown by FIG. 14, the top and bottom edges 130 and 131 are continuous. In a preferred embodiment, the texture map manager 32 utilizes techniques similar to those described above for defining the texture 129 based on texture 106 in order to define the texture 109 (FIG. 10) based on the texture 129.

Figure 16:
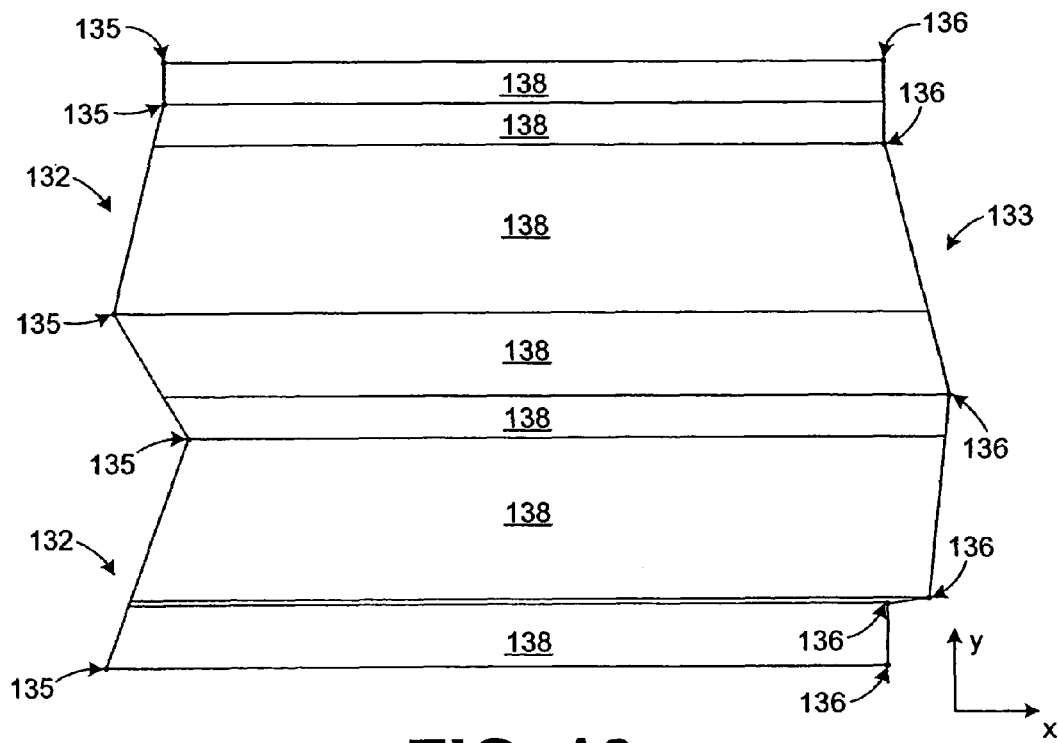
FIG. 16 is a diagram of the texture depicted in FIG. 15 once the texture has been partitioned into horizontal quadrilaterals by a texture map manager, such as is depicted in FIG. 1.

In this regard, the texture map manager 32 preferably identifies discontinuity points 135 along the left edge 132 of the texture 129 and discontinuity points 136 along the right edge 133 of the texture 129. The manager 32 then partitions the texture 129 into horizontal quadrilaterals 138 (FIG. 16), as shown by block 137 of FIG. 11. More specifically, the manager 32 partitions the texture 129 such that each horizontal quadrilateral 138 comprises two parallel horizontal sides (i.e., sides parallel to the x-direction) with each such horizontal side positioned at a point of discontinuity 135 or 136.

Figure 17:
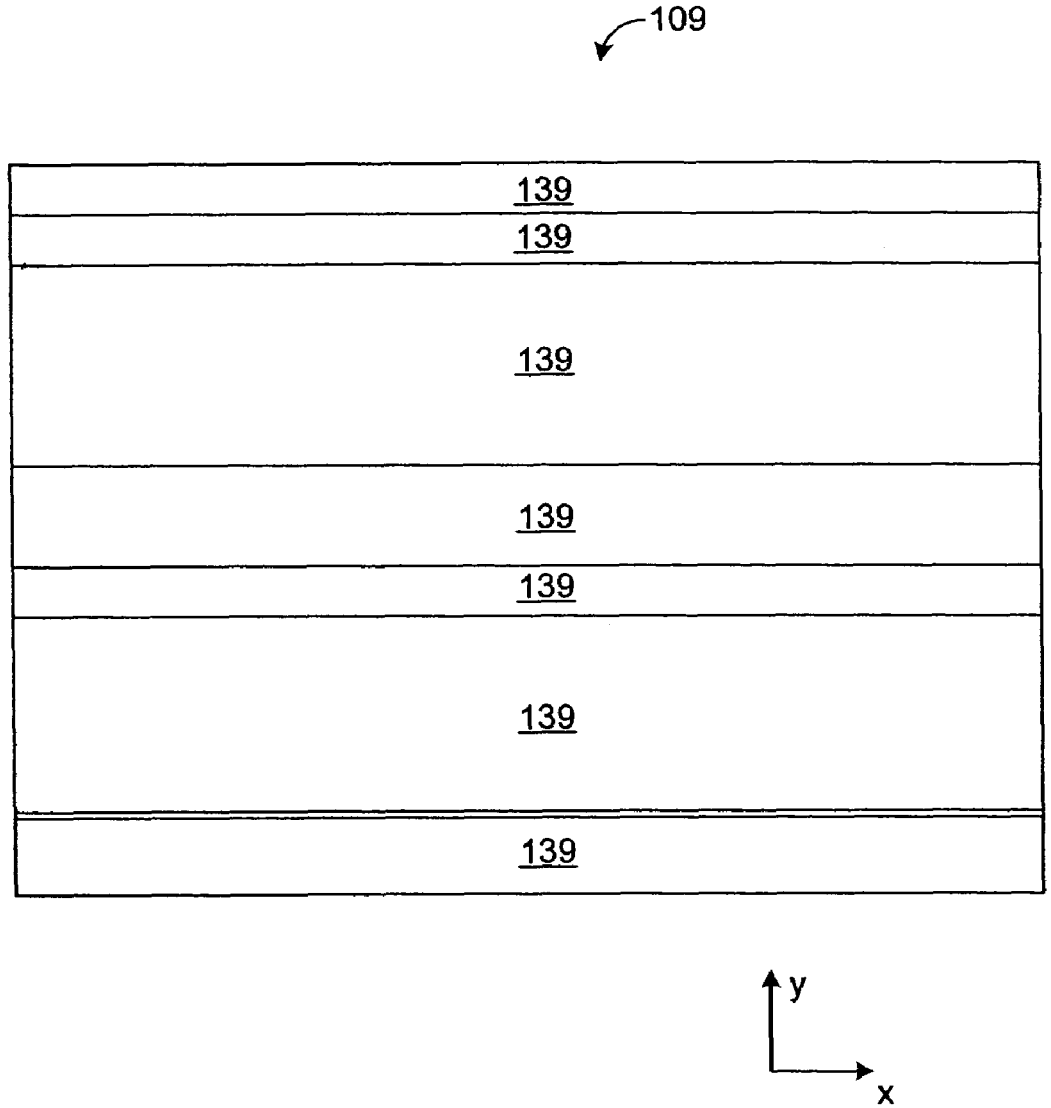
FIG. 17 is a diagram illustrating a texture that may be derived from the texture depicted in FIG. 16 by a texture map manager, such as is depicted in FIG. 1.

After partitioning the texture 129 into horizontal quadrilaterals 138, the texture map manager 32 resamples each of the horizontal quadrilaterals 138 into a rectangle having a width corresponding to the width of the texture 109 (FIG. 10), as depicted by block 141 of FIG. 11. In this regard, the manager 32 preferably utilizes techniques similar to those described above for defining rectangles 119 (FIG. 15) based on vertical quadrilaterals 111 (FIG. 12) in order to define rectangles 139 (FIG. 17) based on horizontal quadrilaterals 138 (FIG. 16) thereby defining the texture 109 depicted by FIGS. 12 and 17.

Thus, by implementing the aforedescribed techniques, the original texture 106 is essentially transformed into a new texture 109 of a desired shape. More specifically, the discontinuous edges of the asymmetrical texture 106 are transformed into continuous edges of a symmetrical texture 109 having opposing edges that are continuous and symmetrical. Indeed, the transformed texture 109 of FIGS. 12 and 17 has a rectangular shape, which can be easily tiled.

It should be noted that it is not necessary for the texture map manager 32 to first partition a texture into vertical and then horizontal quadrilaterals. In this regard, the texture map manager 32 can be configured to partition a texture into horizontal quadrilaterals 138 and to resample these quadrilaterals 138 to form a texture having parallel vertical sides. Then, the manager 32 can be configured to partition the texture into vertical quadrilaterals 111 and to resample these quadrilaterals to form a new texture having parallel vertical and horizontal sides.

Also, if desired, the texture 106 may be resampled without partitioning the texture into horizontal or vertical quadrilaterals. In this regard, if desired, each texel of the new texture may be correlated with at least one texel of the original texture 109 in essentially the same manner described above without actually partitioning the original texture.

In addition, it is possible for various types of texture maps to be resampled according to the resampling techniques described above. As an example, conventional texture maps having texels defined by constant color values rather than luminosity equations may be resampled according to the techniques described above in order to reshape the textures defined by such maps into more desirable shapes. In such examples, the resampling steps performed by the texture map manager 32 are essentially the same as those described above for the PTM 34. However, when resampling a conventional texture map, there are no luminosity equations to be interpolated.

Figure 18:
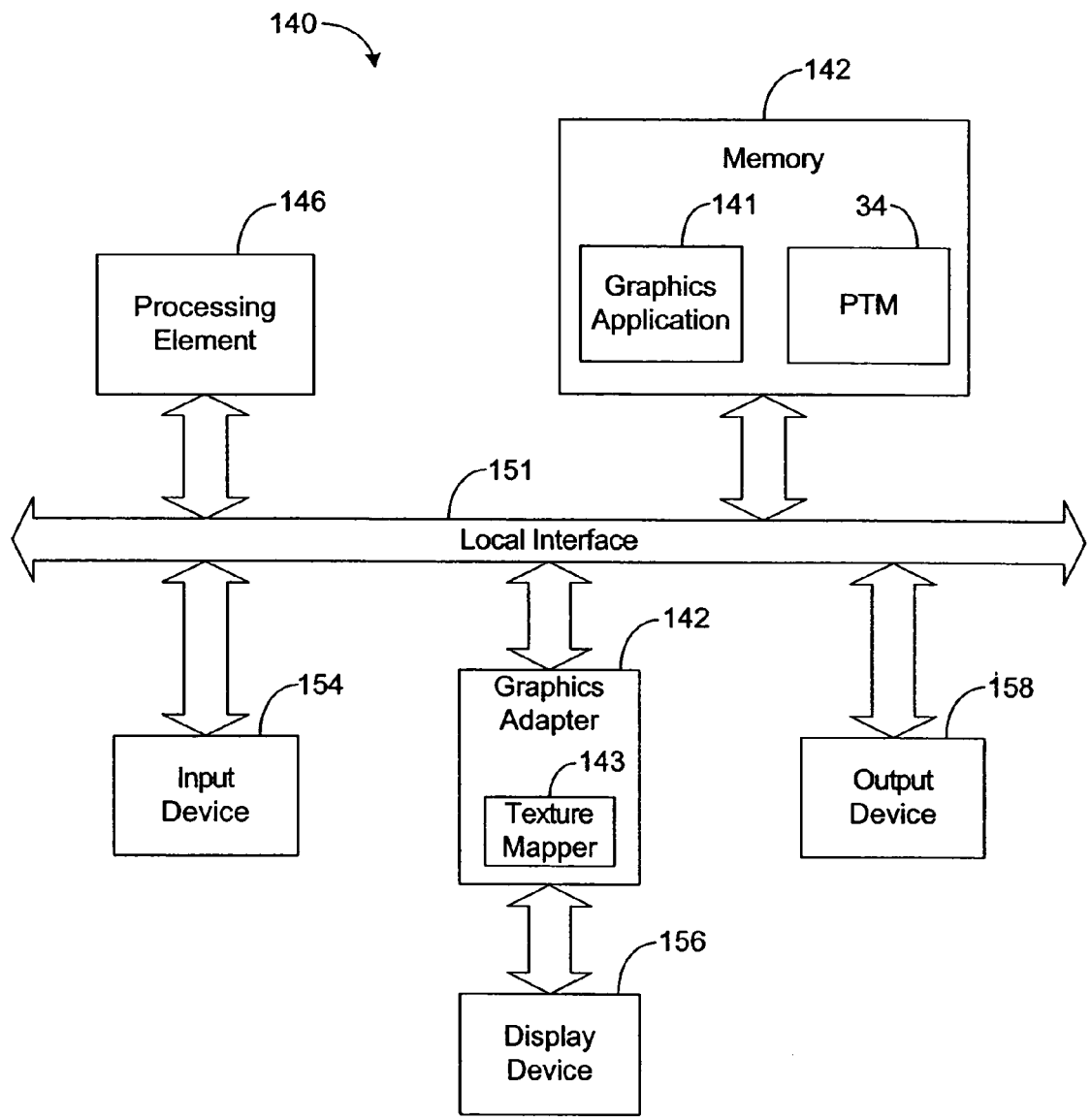
FIG. 18 is a block diagram illustrating an exemplary embodiment of a graphical display system.

Once the texels of the PTM 34 are defined, the PTM 34 may be applied to one or more graphical objects by a graphical display system, such as the system 140 depicted by FIG. 18. Referring to FIG. 18, the system 140 preferably comprises a graphics application 141 having graphical data that defines one or more objects to be rendered by the system 140, and the system 140 preferably comprises a graphics adapter 142 for rendering the graphical objects defined by the graphics application 141. This graphics adapter 142 preferably comprises a texture mapper 143 for applying, to an object's surface, the PTM 34 generated and/or edited by the system 30 (FIG. 1) described above. Note that the graphics application 141 and the graphics adapter 142, including the texture mapper 143, may be implemented in software, hardware, or any combination thereof.

A preferred embodiment of the graphical display system 140 comprises one or more conventional processing elements 146, such as a digital signal processor (DSP) or a central processing unit (CPU), that communicate to and drive the other elements within the system 140 via a local interface 151, which can include one or more buses. Furthermore, an input device 154, for example, a keyboard or a mouse, can be used to input data from a user of the system 140, and an output device 156, for example, a screen display or a printer, can be used to output data to the user.

During operation, the graphics adapter 142 preferably receives graphical data (e.g., primitives) from the graphics application 141 and renders the graphical data to the output device 156. When a graphical object is being rendered by the graphics adapter 142, the texture mapper 143 may apply the texture defined by the PTM 34 to the surface of the graphical object. For illustrative purposes, assume that a graphical object being rendered by the graphics adapter 142 has a surface, referred to hereafter as the "textured surface," to which the texture of the PTM 34 is to be applied.

For each pixel of the textured surface, the texture mapper 143, based on the coordinates of the pixel, maps the pixel to one or more texels of the PTM 34. As set forth above, each texel of the PTM 34 is associated with a luminosity equation in addition to color component values. Moreover, if a single texel is mapped to a pixel of the textured surface, the texture mapper 143 preferably calculates a luminosity value (L) for the mapped texel based on the texel's luminosity equation.

In this regard, the texture mapper 143 determines the direction that light illuminates the pixel or, in other words, determines the values of (u) and (v) for the pixel. Note that, for each primitive, the graphics application 141 preferably specifies a light source direction indicative of a direction of light that is illuminating the primitive. The graphics application 141 also preferably provides data indicative of the primitive's orientation and, more specifically, indicative of a direction that is perpendicular to the primitive's surface. This data is sometimes referred to as a "primitive normal." Knowing the light direction and the primitive normal, the texture mapper 143 may calculate the angle of incidence of the light for the primitive or, in other words, may calculate the primitive's (u) and (v) values. The texture mapper 143 may then substitute these values for the variables (u) and (v), respectively, in the luminosity equation being utilized to calculate the luminosity value being applied to the pixel. Once this is done, all of the values except (L) in the luminosity equation are known, and the texture mapper 143 can, therefore, solve the equation for (L).

In the present embodiment, the calculated luminosity value (L) is a value indicative of the texel's brightness only and is independent of the mapped pixel's color. Thus, to derive the color values of the texel, the texture mapper 143 preferably combines the calculated luminosity value (L) with the texel's color component values (R, G, and B) stored in the PTM 34.

More specifically, the texture mapper 143 preferably multiplies the calculated luminosity value (L) to each color component value (R, G, and B) of the texel to generate new color component values, referred to hereafter as "calculated color component values ($R_c$, $G_c$, and $B_c$)." The texture mapper 143 then applies the calculated color component values ($R_c$, $G_c$, and $B_c$) to the mapped pixel according to well-known or future-developed texture mapping techniques. In this regard, the texture mapper 143 may apply the texel's calculated color component values to the mapped pixel according to the same techniques utilized by conventional texture mappers in applying a texel's constant color component values to a mapped pixel.

If multiple texels of the PTM 34 are mapped to the pixel of the textured surface, then the texture mapper 143 is preferably designed to interpolate new color component values (R', G', and B') and a new luminosity equation (L') based on the color component values and the luminosity equations of the mapped texels. In this regard, it is common for conventional texture mappers to interpolate a texture value for a pixel based on the texture values of a plurality of texels mapped to the pixel. These same interpolation techniques may be employed by the texture mapper 143 to interpolate the new color component values (R', G', and B') based on the corresponding color components (R, G, and B) from the mapped texels.

Furthermore, each luminosity equation, in the preferred embodiment, comprises a set of constants (A, B, C, D, E, and F). The texture mapper 143 preferably utilizes the constants of the luminosity equations of the mapped texels to derive a new set of constants (A', B', C', D', E', and F') for the luminosity equation being interpolated by the mapper 143.

For example, the mapper 143 may be configured to interpolate a new constant (A') based on the corresponding constant (A) from each of the luminosity equations of the mapped texels. As noted above, it is common for conventional texture mappers to interpolate a color value for a pixel based on the color values of a plurality of texels mapped to the pixel. Such interpolation techniques may be employed, by the texture mapper 143, to interpolate (A') based on the corresponding constant (A) from the luminosity equations of the mapped texels. Further note that each of the constants (B', C', D', E', and F') may be similarly interpolated based on the corresponding constants (B, C, D, E, and F), respectively, from the luminosity equations of the mapped texels.

Once the new set of constants (A', B', C', D', E', and F') is determined, the new luminosity equation is defined and may be expressed as:

$$L' = F(u,v) = A'u^2 + B'v^2 + C'uv + D'u + E'v + F',$$

where (u) and (v) are variables representing the angular components of the angle of incidence of the light illuminating the pixel. After determining this new luminosity equation and the values of (u) and (v), the texture mapper 143 preferably calculates a luminosity value (L') based on the new luminosity equation. The texture mapper 143 preferably multiples each of the new color component values (R', G', and B') to the calculated luminosity value (L') to generate a calculated set of color component values ($R_c$, $G_c$, and $B_c$) and then applies the calculated color component values to the mapped pixel. In applying the calculated color component values ($R_c$, $G_c$, and $B_c$) to the mapped pixel, the texture mapper 143 may utilize the same techniques employed by conventional texture mappers in applying a texel's color component values to a mapped pixel.

It should be noted that various modifications may be made to the embodiments described above without departing from the principles of the present invention. For example, in the embodiment described above, each texel of a PTM 34 comprises color component values (R, G, and B) and a luminosity equation (L). Furthermore, when applying a texel to a pixel, the texture mapper 143 generally calculates (L) based on light position and multiplies each color component value (R, G, and B) by the calculated value (L). However, if desired, the color component values (R, G, and B) may be respectively combined (e.g., multiplied) with the luminosity equation (L) to generate three new luminosity equations ($L_{red}$, $L_{green}$, and $L_{blue}$), referred to hereafter as "color component luminosity equations." Each of the color component luminosity equations may then be stored in the PTM 34 to define a texel in lieu of the color component values (R, G, and B) and the single luminosity equation (L).

During texture mapping, each of the color component luminosity equations ($L_{red}$, $L_{green}$, and $L_{blue}$) may be solved based on light direction in the same way that the luminosity equation (L) is solved in the embodiment previously described above. Solving the color component luminosity equations generates three color component luminosity values ($L_{red}$, $L_{green}$, and $L_{blue}$). Note that each of the color component luminosity values ($L_{red}$, $L_{green}$, and $L_{blue}$), similar to the calculated color component values ($R_c$, $G_c$, and $B_c$) described above, is a value indicative of one of the texel's color components that is to be applied to the mapped pixel. In this regard, the color component luminosity values ($L_{red}$, $L_{green}$, and $L_{blue}$) are indicative of both brightness and color. Moreover, the color component luminosity values ($L_{red}$, $L_{green}$, and $L_{blue}$) may be applied to the mapped pixel in the same way that conventional texture mappers apply the constant color component values of a texel of a conventional texture map to a corresponding pixel.

Note that the techniques described above for performing texture resampling are generally the same when a PTM 34 is defined by color component luminosity equations ($L_{red}$, $L_{green}$, and $L_{blue}$) rather than a luminosity equation (L). However, such techniques are preferably repeated for each color component luminosity equation.

For example, during texture resampling, the manager 32 is described above as sometimes interpolating a luminosity equation for a texel of a new texture 109 based on the luminosity equations (L) of corresponding texels in the original texture 106. When color component luminosity equations ($L_{red}$, $L_{green}$, and $L_{blue}$) are employed, the same techniques may be utilized to interpolate a new color component luminosity equation for each color component.

For example, a red color component luminosity equation for a texel of the new texture 109 may be interpolated from the red color component luminosity equations for the corresponding texels of the original texture 106. Similarly, blue and green color component luminosity equations for the texel of the new texture 109 may be respectively interpolated from blue and green color component luminosity equations for the corresponding texels of the original texture 106. Thus, by repeating the aforedescribed resampling techniques for each color component of each texel, a new texture 109 can be derived from an original PTM texture 106 that is defined by color component luminosity equations ($L_{red}$, $L_{green}$, and $L_{blue}$).

It should be noted that defining multiple color component luminosity equations ($L_{red}$, $L_{green}$, and $L_{blue}$) for each texel likely requires more data than defining three color component values (R, G, and B) and a single luminosity equation (L) for each texel. Therefore, in some embodiments, it may be desirable to define the texels of a PTM 34 with color component values (R, G, and B) and a luminosity equation (L) according to previously described embodiments.

However, in some embodiments, utilizing color component luminosity equations may help to improve texture mapping results. In this regard, in generating a PTM 34, the texture map manager 32 may be configured to subdivide the sample color value measured for each image into color components (e.g., red, green, and blue). More specifically, the texture map manager 32, when analyzing the texture image data 97, may measure or otherwise determine the luminosity of each color component. Then, for each texel, the texture map manager 32 may determine a color component luminosity equation for each color component rather than a single luminosity equation (L), as previously described above.

Note that in determining color component luminosity equations ($L_{red}$, $L_{green}$, and $L_{blue}$) in such an embodiment, the texture map manager 32 may employ techniques similar those described above in the preferred embodiment for determining a texel's luminosity equation (L). For example, to determine a red color component luminosity equation ($L_{red}$, $L_{green}$) for a texel, the texture map manager 32 (FIG. 1) may measure a red luminosity value ($L_{red}$) for the corresponding pixel in each digital image defined by the texture image data 97. The manager 32 may then plot each measured red luminosity value ($L_{red}$) as a function of the angle of incidence associated with the measured red luminosity value, similar to how the manager 32 in the previously described embodiment plots (L) as a function of the angle of incidence associated with (L). However, note that ($L_{red}$) in the present embodiment is a value indicative of both color and brightness, whereas (L) in the previously described embodiment is indicative of brightness only.

After plotting ($L_{red}$) for the corresponding pixel in each image defined by the texture data 97, the texture map manager 32 may fit a three-dimensional curve to the plotted points and derive an equation ($L_{red}$) of this curve. Such an equation represents an approximation of the texel's luminosity behavior for the red color component and may be expressed as:

$$L_{red} = F(u,v) = (A_{red})u_2 + (B_{red})v^2 + (C_{red})uv + (D_{red})u + (E_{red})v = F_{red}.$$

Similar techniques may be employed to determine color component luminosity equations for the other color components of the texel. For example, when the other color components are blue and green, the luminosity equations for the other color components may be expressed as:

$$L_{blue} = F(u,v) = (A_{blue})u_2 + (B_{blue})v^2 + (C_{blue})uv + (D_{blue})u + (E_{blue})v = F_{blue};$$

and $$L_{green} = F(u,v) = (A_{green})u_2 + (B_{green})v^2 + (C_{green})uv + (D_{green})u + (E_{green})v = F_{green}.$$

Moreover, in the present embodiment, each texel of the PTM 34 may comprise a different luminosity equation ($L_{red}$, $L_{green}$, and $L_{blue}$) for each color component. Each of these equations may then be used, as described above, to apply a color component of the texel to a corresponding pixel.

Note that when color component luminosity equations are separately generated by the manager 32 as just described above, the luminosity behavior of each color component may be different. In other words, the red color component of a texel may appear to respond to changes in light direction in a different manner than the other color components of the texel. Such an effect may help to enhance the realism of the texture defined by the PTM 34.

It should also be noted that, in the embodiment described above, the luminosity equations, including the color component luminosity equations, are represented as bi-quadratic polynomials. However, in other embodiments, the luminosity equations may be defined by other types of equations. For example, if desired, bi-cubic polynomials could be utilized to express the luminosity equations. In such embodiments, similar techniques as those described above for the aforedescribed embodiments may be employed in order to determine and apply luminosity values to different pixels.

To better illustrate the texture map generation and texture mapping processes described above, assume that the graphics application 141 (FIG. 18) comprises graphical data defining an image of a car seat. Further assume that it is desirable for a viewer to see an image of the car seat as if the car seat is covered in a particular fabric. In a preferred embodiment, a sample of the fabric is positioned underneath the dome structure 72 of FIG. 2 and below the camera 76. Once this occurs, the user preferably submits an input, via input device 54 (FIG. 1), indicating that the image capture phase may commence.

Figure 19:
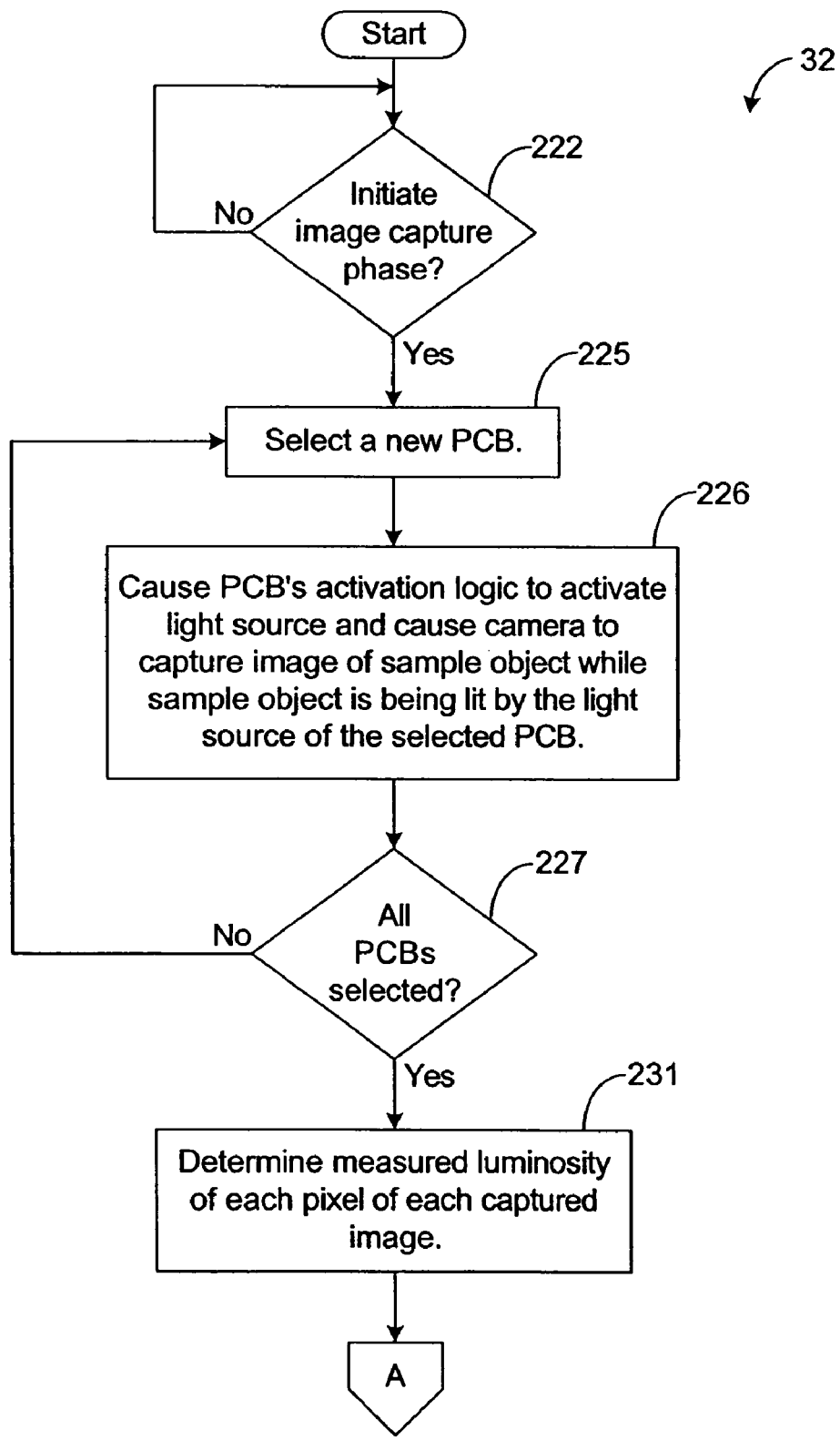
FIGS. 19 and 20 illustrate a flow chart depicting an exemplary process for generating a PTM.

In response, the texture map manager 32 selects a PCB 92, as shown by blocks 222 and 225 of FIG. 19. The texture map manager 32 then transmits an activation command to the selected PCB 92 and transmits an image capture command to the camera 76 such that the camera 76 takes a picture of the sample object 86 (i.e., the sample fabric) as the object 86 is being illuminated by the light source 95 of the selected PCB 92, as shown by block 226. Once the image of the object is captured, the camera 76 preferably stores the captured image in memory 42 (FIG. 1) as a set of texture image data 97. Note that an image captured by a PCB 92 is associated with a particular set of (u) and (v) values representing the angular components of the angle of incidence that the light from the PCB's light source 95 illuminates the object 86. The (u) and (v) values may be predefined values stored in the system 30.

As an example, a user may physically measure or estimate the direction or angle from which the PCB's light source 95 illuminates the sample object 86. The user may then program the (u) and (v) components values into the texture map manager 32. Then, when the camera 76 captures an image of the object 86, which the PCB's light source 95 is illuminating, the texture map manager 32 may associate the programmed (u) and (v) values with the captured image.

After the image is captured, the texture map manager 32 preferably selects another PCB 92 and repeats the aforedescribed techniques, as shown by blocks 225-227, such that another image is captured as the object 86 is being illuminated from a different direction by the light source 95 of another PCB 92. As shown by block 231, the texture map manager 32 preferably measures or otherwise determines the luminosity of each pixel within each of the texture images defined by the texture image data 97. These measured luminosity values may then be used to determine color component values and luminosity equations for the different texels of the PTM 34.

Figure 20:
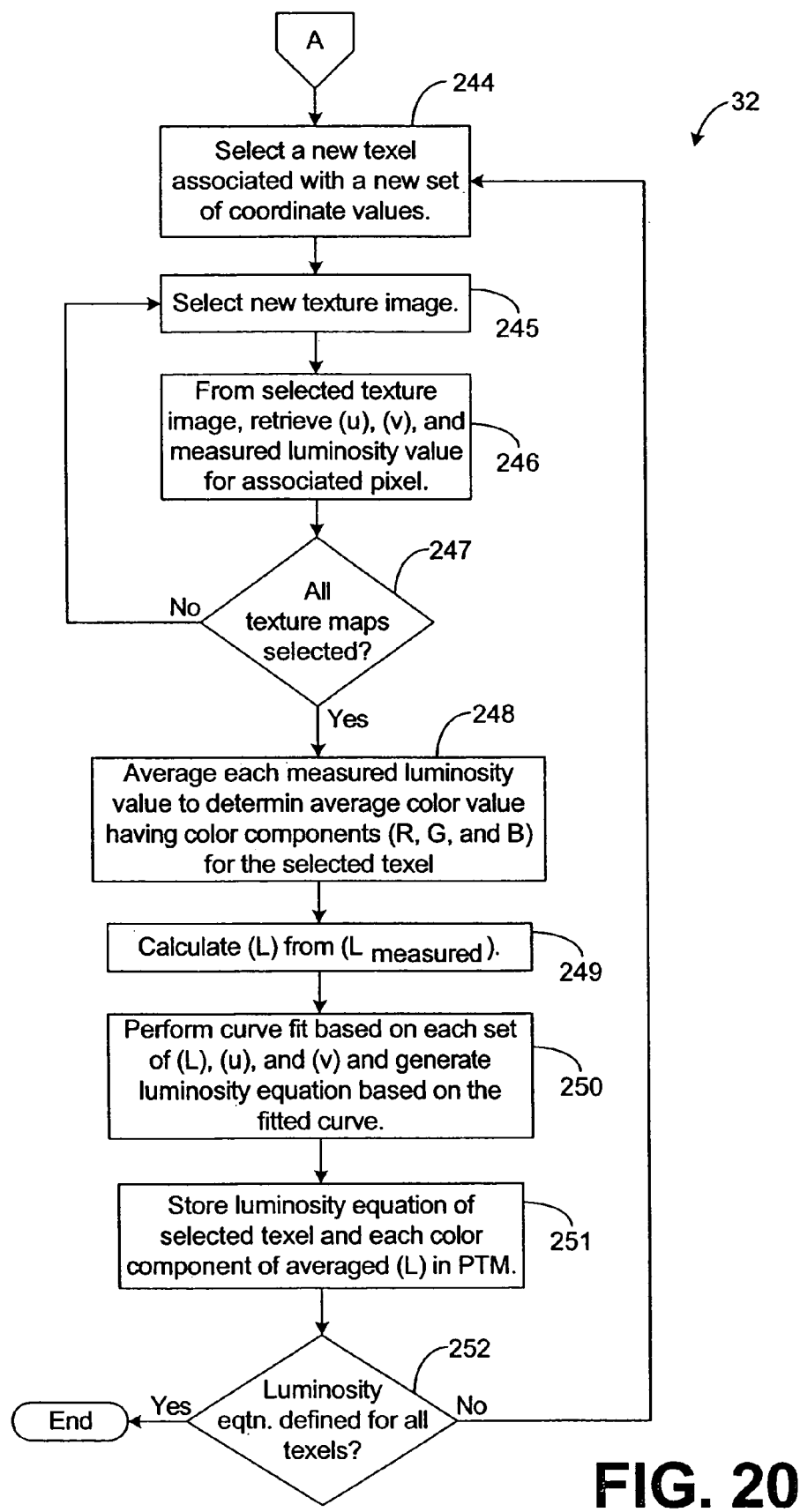

In this regard, the texture map manager 32, in block 244 of FIG. 20, preferably selects a new texel, which is associated with a particular set of coordinate values. Then, in block 245, the texture map manager 32 selects a new texture image defined by the data 97. For this selected texture image, the texture map manager 32 retrieves, in block 246, the measured luminosity value ($L_{measured}$) for the pixel that is located at the particular set of coordinate values associated with the texel selected in block 244. In block 246, the texture. map manager 32 also retrieves the (u) and (v) values associated with the texture image selected in block 245.

After retrieving a set of ($L_{measured}$), (u), and (v) values in block 246, the texture map manager 32 selects another texture image and repeats blocks 245 and 246. As shown by blocks 245-247, the texture map manager 32 continues to repeat blocks 245 and 246 for different texture images until block 246 has been performed for all of the texture images defined by the data 97.

As shown by block 248, the texture map manager 32 then calculates an average, referred to hereafter as the "($L_{averaged}$)," of the measured luminosity values ($L_{measured}$) retrieved via block 246. The color components of ($L_{averaged}$) are preferably utilized as the color components (R, G, and B) of the selected texel. Further, in block 249, each measured luminosity value ($L_{measured}$) retrieved in block 246 is converted into a luminosity value (L) by dividing the measured luminosity value ($L_{measured}$) by the ($L_{averaged}$). This luminosity value (L) is indicative of brightness only in the present example.

As shown by block 250, the texture map manager 32 performs a curve fit, using each set of (L), (u), and (v) values derived from a single texture image as a different data point, and the texture map manager 32, based on this curve fit, determines an equation for the fitted curve. This equation is the luminosity equation for the PTM texel selected in block 244 and is stored in the PTM 34 in block 251 along with the color component values of the selected texel. Note that if the texture defined by the PTM 34 is distorted or otherwise undesirable, resampling may be performed-according to the resampling techniques described above in order to define a texture of a more desirable shape.

After defining and storing the luminosity equation and color component values for one texel of the PTM 34 via blocks 244-251, the texture map manager 32 repeats blocks 244-251 for another texel that is associated with another set of coordinates. Indeed, the texture map manager 32 preferably repeats blocks 244-251 for each different texel of the PTM 34. Once a luminosity equation has been defined for each texel of the PTM 34 in this way, the-PTM 34 is complete, and the process of generating the PTM 34 preferably ends, as shown by block 252.

Figure 21:
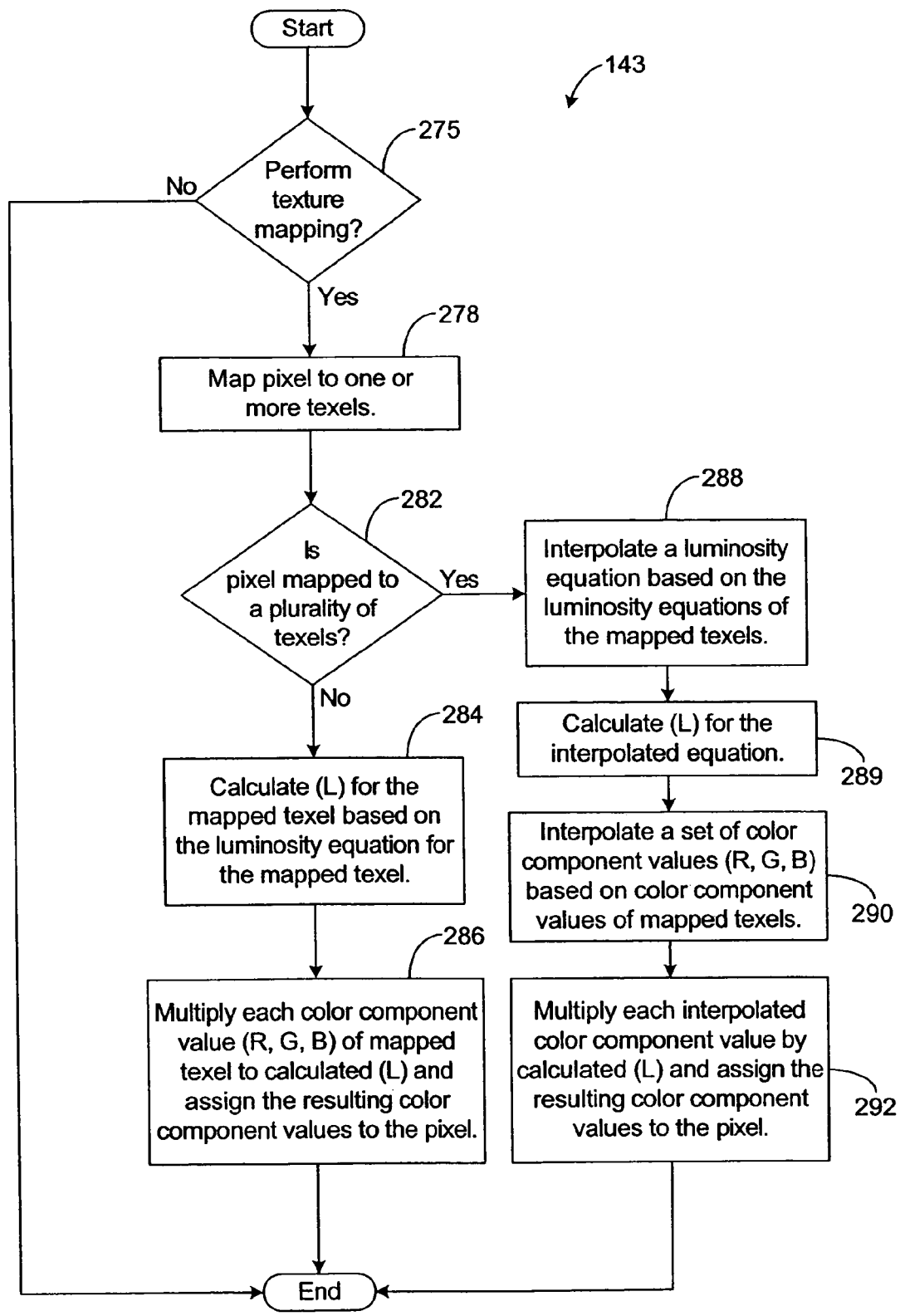
FIG. 21 illustrates a flow chart depicting an exemplary process for performing texture mapping.

After the PTM 34 has been generated, the PTM 34 may be stored and used by the graphical display system 140 of FIG. 18. In this regard, the graphics application 141 may generate primitives defining the car seat described above. When the graphics adapter 142 is rendering a pixel of the car seat's surface, the texture mapper 143 preferably applies the PTM 34 to the pixel. More particularly, when rendering the pixel, the texture mapper 143 determines, in block 275 of FIG. 21, whether the pixel defines A-portion of the car seat surface. If so, the texture mapper 143 maps one or more texels of the PTM 34 to the pixel, as shown by block 278.

If a single texel is mapped to the pixel, then the mapper 143 calculates a luminosity value (L) from the mapped texel's luminosity equation stored in the PTM 34, as shown by blocks 282 and 284. Note that this luminosity value is based on the angle of incidence for the light that illuminates the pixel. As set forth above, this angle of incidence may be determined from data provided by the graphics application 141. After calculating a luminosity value (L) from the mapped texel's luminosity equation, the mapper 143 multiplies each of the color component values (R, G, and B) of the mapped texel by the calculated luminosity value (L) to generate a set of calculated color component values ($R_c$, $G_c$, and $B_c$), as shown by block 286. Also in block 286, the texture mapper 143 applies or assigns the calculated color component values ($R_c$, $G_c$, and $B_c$) to the pixel.

If multiple texels of the PTM 34 are mapped to the pixel in block 278, then the texture mapper 143 is preferably designed to interpolate a new luminosity equation based on the luminosity equations of the mapped texels, as shown by blocks 282 and 288. After interpolating a new luminosity equation in block 288, the texture mapper 143 calculates a luminosity value (L) from the interpolated luminosity equation, as shown by block 289. Note that this luminosity value is based on the angle of incidence for the light that illuminates the pixel.

As shown by block 290, the mapper 143 interpolates a set of color component values (R, G, and B) based on the color component values of the mapped texels. The mapper 143 then multiples each of the interpolated color component values by the calculated luminosity value (L) to generate a set of calculated color component values ($R_c$, $G_c$, and $B_c$), as shown by block 292. Also in block 292, the mapper 143 applies or assigns the calculated color component values ($R_c$, $G_c$, and $B_c$) to the pixel.

After color component values are assigned to the pixel in block 286 or 292, the pixel is rendered by the graphics adapter 142. The output device 156 then displays the pixel based on the color component values assigned to the pixel by the texture mapper 143.

Note that as the texture mapper 143 receives more primitives of the car seat's surface, tiling techniques may be employed to apply the PTM 34 across the surface of the car seat. Tiling techniques for applying a texture map across the surface of a graphical object are generally well-known in the art.

Once each of the pixels of the car seat is rendered by the graphics adapter 142, the display device 156 displays an image of the car seat. This displayed car seat appears to be covered with the fabric from which the texture image data 97 is based. In other words, the displayed car seat appears to be covered with the fabric (i.e., the sample object 86) positioned underneath the dome structure 72 (FIG. 2).

Furthermore, by defining the luminosity equations as a function of light direction, as described above, the luminosity equations take into account the phenomena that different point elements of the sample fabric may appear to respond to changes in light direction differently. Thus, utilization of the luminosity equations to calculate the color values that are applied to the car seat by the texture mapper 143 helps to create a more realistic image of the car seat.

It should be noted that, in the preferred embodiment, the user of the system 140 may submit an input, via input device 154, for changing the direction from which the graphical object (e.g., the car seat) is being illuminated. For example, the user may submit an input for moving a simulated light source illuminating the graphical object from one screen position to a different screen position. In response to such an input, the graphics application 141 preferably calculates a new angle of incidence for each primitive of the graphical object based on the new position of the light source relative to the graphical object. According to the aforedescribed rendering process, the new angle of incidence affects the luminosity values calculated from the luminosity equations in blocks 284 and 289 of FIG. 21. More specifically, a different angle of incidence may cause the texture mapper 143 to calculate a different luminosity value (L) from the same luminosity equation.

Figure 22:
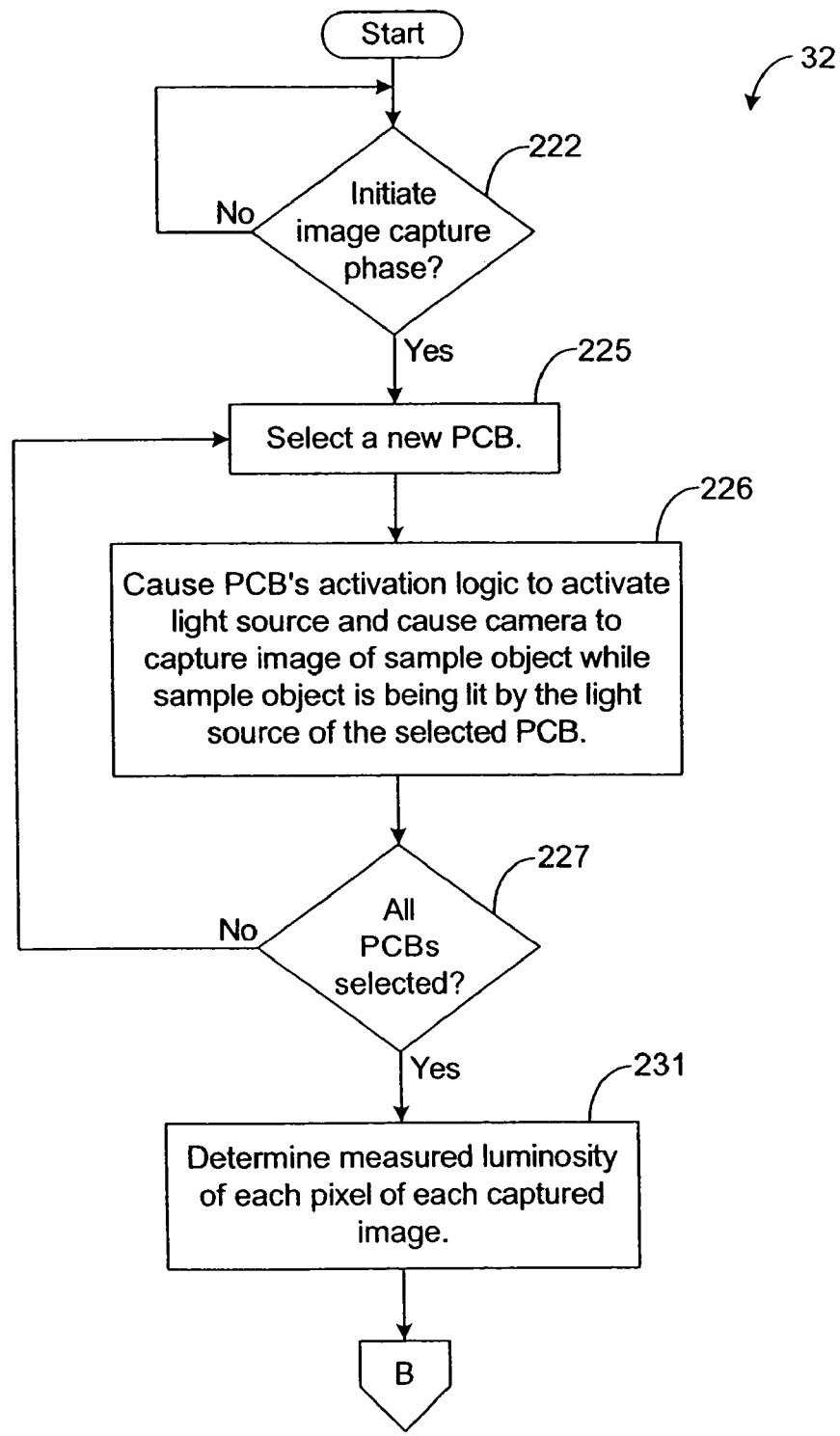
FIGS. 22 and 23 illustrate a flow chart depicting an exemplary process for generating a PTM.
Figure 23:
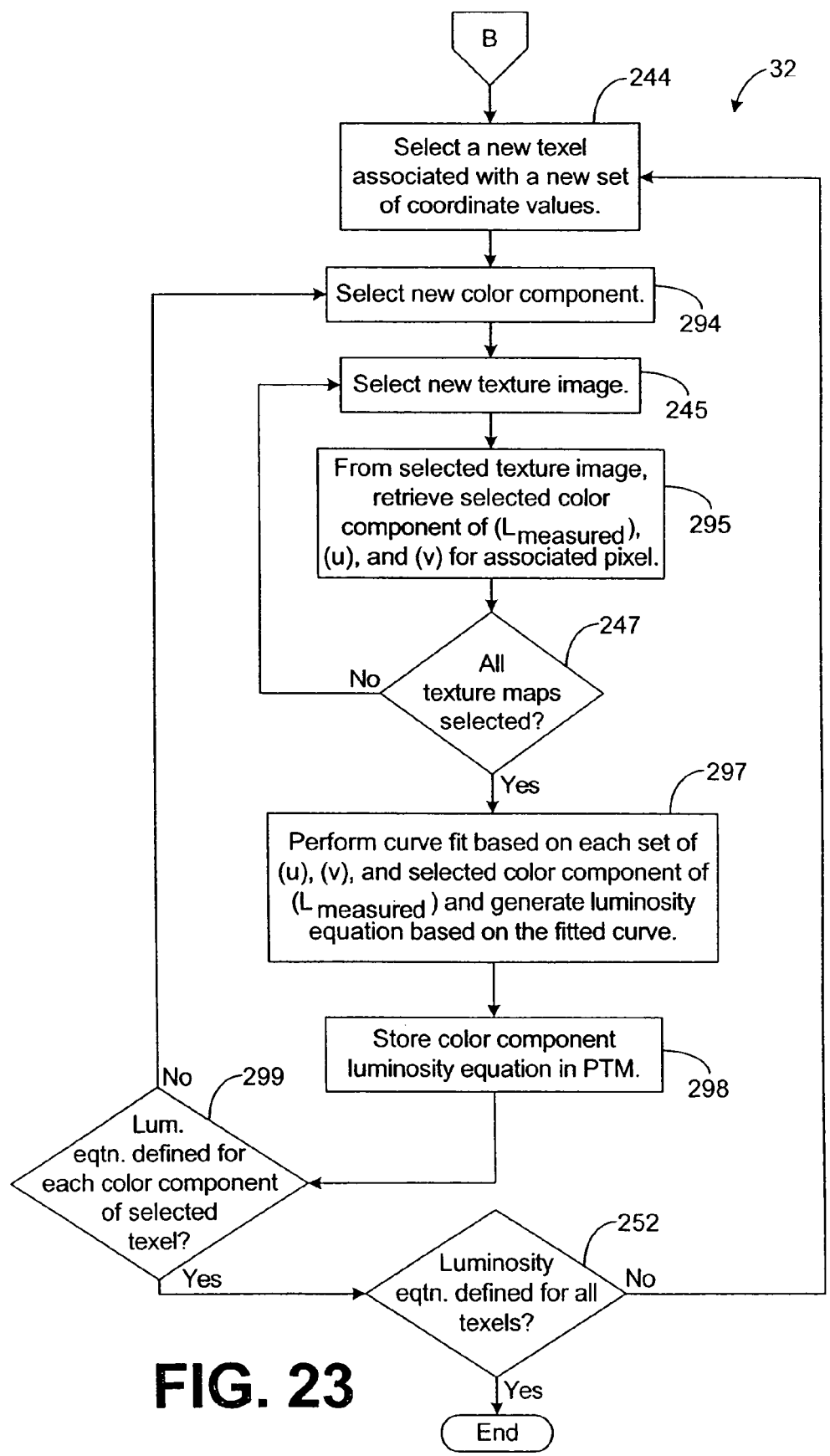

FIGS. 22 and 23 depict an exemplary process for generating a PTM 34 having texels defined by color component luminosity equations ($L_{red}$, $L_{green}$, and $L_{blue}$). As can be seen by comparing FIGS. 22 and 23 to FIGS. 19 and 20, the foregoing process may be similar to the PTM generation process depicted by FIGS. 19 and 20. However, in the process depicted by FIGS. 22 and 23, the texture map manager 32, after performing block 244, selects a color component (e.g., red, green, or blue) in block 294. Then, after selecting a new texture image in block 245, the texture map manager 32, in block 295, retrieves the selected component of the measured luminosity value ($L_{measured}$) for the pixel that is located at the set of coordinate values associated with the texel selected in block 244. The texture map editor 32 also retrieves the angular components (u) and (v) for the angle of incidence of the texture image selected in block 295. Note, in particular, that the luminosity value retrieved in block 295 is a color component of the overall luminosity value measured for the associated pixel.

For example, if the red color component is selected in block 294, then the manager 32 preferably retrieves the red color component of the measured luminosity value ($L_{measured}$). Therefore, the luminosity equation later generated in block 297 and stored in block 298 preferably corresponds to a representation of the luminosity behavior-of the selected color component only. As depicted by block 299, the aforedescribed process for defining and storing a color component luminosity equation for the selected texel is repeated for each different color component of the selected texel. Moreover, once the process depicted by FIGS. 22 and 23 is completed, each texel preferably comprises color component equations ($L_{red}$, $L_{green}$, and $L_{blue}$).

Figure 24:
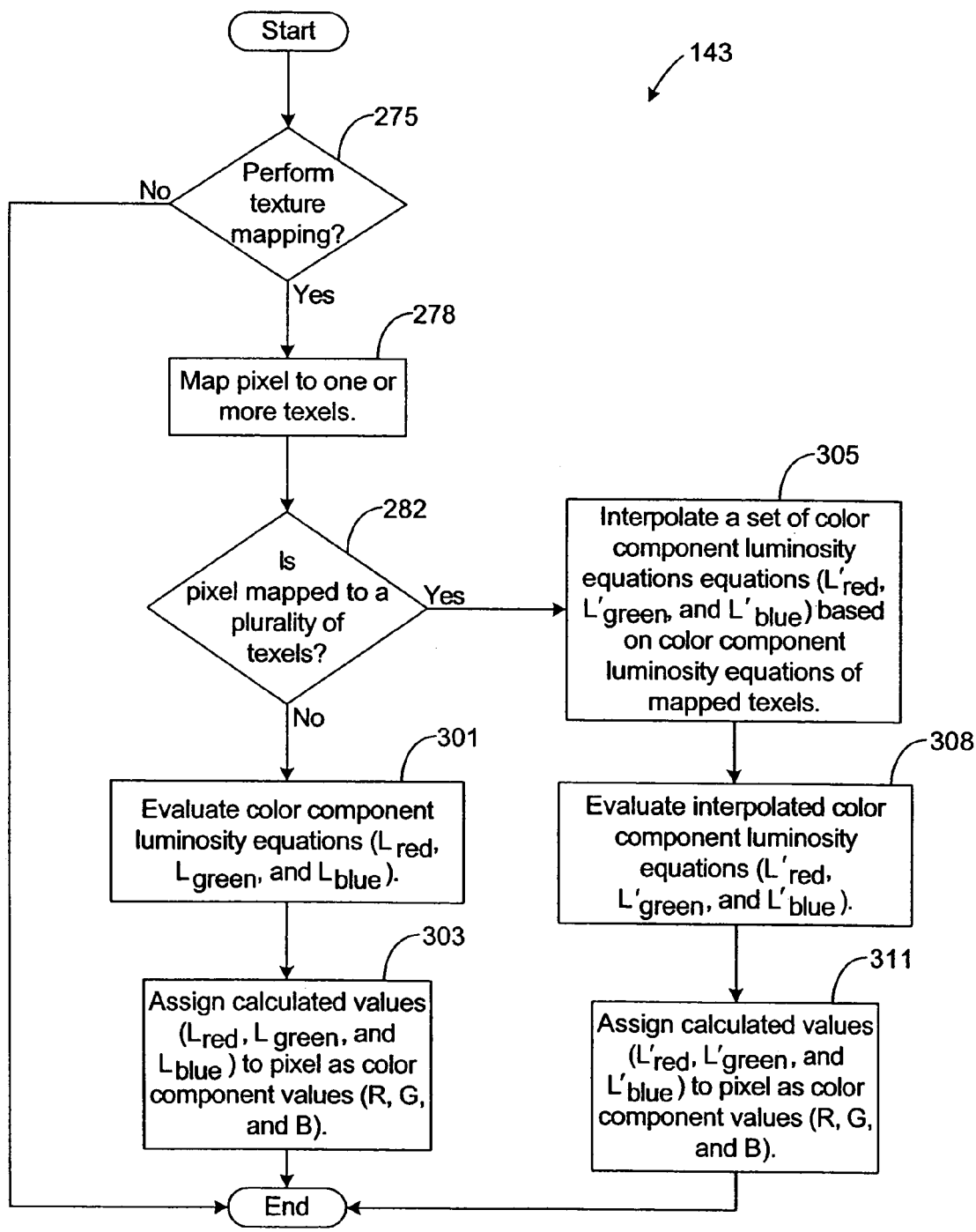
FIG. 24 illustrates a flow chart depicting an exemplary process for performing texture mapping.

FIG. 24 depicts an exemplary process for applying a PTM 34, such as one generated by the process depicted by FIGS. 22 and 23, that has texels defined by color component luminosity equations ($L_{red}$, $L_{green}$, and $L_{blue}$). When the graphics adapter 142 is rendering a pixel, the texture mapper 143 preferably applies the PTM 34 to the pixel. In this regard, when rendering the pixel, the texture mapper 143 determines, in block 275, whether the pixel defines a portion of a surface of a graphics object, such as the car seat described above. If so, the texture mapper 143 maps one or more texels of the PTM 34 to the pixel, as shown by block 278.

If a single texel is mapped to the pixel, then the mapper 143 evaluates the color component luminosity equations ($L_{red}$, $L_{green}$, and $L_{blue}$) defined by the mapped texel, as shown by blocks 282 and 301. Note that each color component luminosity equation ($L_{red}$, $L_{green}$, and $L_{blue}$) is based on the angle of incidence for the light that illuminates the pixel. As set forth above, this angle of incidence may be determined from the graphics application 141 in order to calculate color component luminosity values ($L_{red}$, $L_{green}$, and $L_{blue}$) from the color component luminosity equations in block 301. After calculating the color component values ($L_{red}$, $L_{green}$, and $L_{blue}$) in block 301, the mapper 143 applies or assigns the calculated color component values ($L_{red}$, $L_{green}$, and $L_{blue}$) to the pixel, as shown by block 303. In this regard, the mapper 143 assigns the color component luminosity value ($L_{red}$) to the pixel as the pixel's red color component value (R). The mapper 143 also assigns the color component luminosity values ($L_{green}$ and $L_{blue}$) to the pixel as the pixel's green and blue color component values (G and B), respectively.

If multiple texels of the PTM 34 are mapped to the pixel in block 278, then the texture mapper 143 is preferably designed to interpolate a new set of color component luminosity equations ($L'_{red}$, $L'_{green}$, and $L'_{blue}$) based on the color component luminosity equations ($L_{red}$, $L_{green}$, and $L_{blue}$) of the mapped texels, as shown by blocks 282 and 305. This may be achieved by interpolating each constant (A', B', C', D', E', and F') of the interpolated equation based on the corresponding constants (A, B, C, D, E, and F) of the corresponding color component luminosity equations ($L_{red}$, $L_{green}$, and $L_{blue}$) of the mapped texels.

For example, to interpolate the constant ($A_{red}$) of the new red color component equation ($L'_{red}$), the texture mapper 143 may calculate a weighted average (weighted based on the pixel's position relative to the mapped texels) of the constant ($A_{red}$) from each red color component luminosity equation ($L_{red}$) of the mapped texels. Furthermore, the other constants ($B'_{red}$, $C'_{red}$, $D'_{red}$, $E'_{red}$, and $F'_{red}$) of the new red color component luminosity equation ($L'_{red}$) may be respectively interpolated, via similar techniques, from the constants ($B_{red}$, $C_{red}$, $D_{red}$, and $F_{red}$) of the red color component luminosity equations ($L_{red}$) of the mapped texels.

After interpolating new color component luminosity equations ($L'_{red}$, $L'_{green}$, and $L'_{blue}$) in block 305, the texture mapper 143 preferably evaluates the interpolated color component luminosity equations ($L'_{red}$, $L'_{green}$, and $L'_{blue}$), as shown by block 308. Note that each interpolated color component luminosity equation ($L'_{red}$, $L'_{green}$, and $L'_{blue}$) is based on the angle of incidence for the light that illuminates the pixel. As set forth above, this angle of incidence may be determined from data provided by the graphics application 141 in order to calculate color component luminosity values ($L'_{red}$, $L'_{green}$, and $L'_{blue}$) from the color component luminosity equations in block 308. After calculating the color component values ($L'_{red}$, $L'_{green}$, and $L'_{blue}$) in block 308, the mapper 143 applies or assigns the calculated color component values ($L'_{red}$, $L'_{green}$, and $L'_{blue}$) to the pixel, as shown by block 311.

After color component values are assigned to the pixel in block 303 or 311, the pixel is rendered by the graphics adapter 142. The output device 156 then displays the pixel based on the color component values assigned to the pixel by the texture mapper 143 in block 303 or 311.

The invention claimed is:

1. A system for resampling texture maps, comprising:
memory for storing a first texture map defining a first texture, the first texture having opposing edges that are asymmetrical; and
a texture map manager configured to resample the first texture map such that resampling of the first texture map, by the texture map manager, transforms the asymmetrical opposing edges into symmetrical opposing edges, wherein the texture map manager is configured to generate a second texture map based on resampling of the first texture map by the texture map manager, the second texture map defining a second texture having the symmetrical opposing edges, wherein the texture map manager is configured to determine a value indicative of a distance that a texel of the second texture map is located from one of the opposing edges of the second texture and to mathematically combine the value with a value indicative of a separation distance between the opposing edges of the second texture, and wherein the texture map manager is configured to mathematically combine the values in order to determine the texel's position within the second texture as a percentage of the separation distance.

2. A system for resampling texture maps, comprising:
memory for storing a first texture map defining a first texture, the first texture having opposing edges that are asymmetrical; and
a texture map manager configured to resample the first texture map such that resampling of the first texture map, by the texture map manager, transforms the asymmetrical opposing edges into symmetrical opposing edges, wherein the texture map manager is configured to generate a second texture map based on resampling of the first texture map by the texture map manager, the second texture map defining a second texture having the symmetrical opposing edges, wherein the first texture map comprises a plurality of texels that are each defined by a luminosity equation that is a function of light position, and wherein the second texture map comprises a plurality of texels that are each defined by a luminosity equation that is a function of light position.

3. The system of claim 2, wherein each of the luminosity equations comprises constants, wherein the texture mapping manager is configured to correlate a texel of the second texture map with a plurality of texels of the first texture map, and wherein the texture mapping manager is configured to interpolate luminosity equation constants of the plurality of texels in order to determine at least one constant of the second texture map texel.

4. A method for resampling texture maps, comprising:
defining a first texture via a first texture map, the first texture having opposing edges that are asymmetrical;
storing at least a portion of the first texture mare in memory;
resampling the first texture map thereby transforming the asymmetrical opposing edges into symmetrical opposing edges; and
generating a second texture map via the resampling, the second texture map defining a second texture having the symmetrical opposing edges, wherein the generating comprises:
determining a value indicative of a distance that a texel of the second texture map is located from one of the edges of the second texture; and
mathematically combining the value with a value indicative of a separation distance between the opposing edges of the second texture.

5. The method of claim 4, wherein the generating further comprises determining, based on the mathematically combining, the texel's position within the second texture as a percentage of the separation distance.

6. A method for resampling texture maps, comprising:
defining a first texture via a first texture map, the first texture having opposing edges that are asymmetrical, wherein the first texture map comprises a plurality of texels that are each defined by a luminosity equation that is a function of light position;
storing at least a portion of the first texture mare in memory;
resampling the first texture map thereby transforming the asymmetrical opposing edges into symmetrical opposing edges; and
generating a second texture map via the resampling, the second texture map defining a second texture having the symmetrical opposing edges, wherein the second texture map comprises a plurality of texels that are each defined by a luminosity equation that is a function of light position.

7. The method of claim 6, wherein each of the luminosity equations comprises constants, and wherein the generating comprises:
correlating a texel of the second texture map with a plurality of texels of the first texture map; and
determining at least one constant of the second texture map texel, wherein the determining comprises interpolating luminosity equation constants of the plurality of texels.

8. A method for resampling texture maps, comprising:
defining a first texture via a first texture map, the first texture having opposing edges that are asymmetrical in shape, the first texture map based on an image of an object having a surface distortion, wherein the first texture map defines a luminosity behavior that is a function of light position;
storing at least a portion of the first texture mare in memory; and
resampling the first texture map thereby transforming the opposing edges that are asymmetrical in shape into opposing edges that are symmetrical in shape,
wherein the resampling compensates for the surface distortion such that the resampling provides a texture map defining a luminosity behavior that is a function of light position and more closely resembles, relative to the luminosity behavior defined by the first texture map, a luminosity behavior of the object prior to the surface distortion.

9. The method of claim 8, wherein the opposing edges that are symmetrical in shape are parallel.

10. The method of claim 8, further comprising generating a second texture map via the resampling, the second texture map defining a second texture having the opposing edges that are symmetrical in shape.

11. A system for resampling texture maps, comprising:
memory for storing a first texture map defining a first texture, the first texture having opposing edges that are asymmetrical in shape, the first texture map based on an image of an object having a surface distortion, wherein the first texture map defines a luminosity behavior that is a function of light position; and
a texture map manager configured to resample the first texture map such that resampling of the first texture map, by the texture map manager, transforms the opposing edges that are asymmetrical in shape into opposing edges that are symmetrical in shape,
wherein resampling of the first texture map, by the texture map manager, compensates for the surface distortion such that the resampling provides a texture map defining a luminosity behavior that is a function of light position and more closely resembles, relative to the luminosity behavior defined by the first texture map, a luminosity behavior of the object prior to the surface distortion.

12. The system of claim 11, wherein the opposing edges that are symmetrical in shape are parallel.

13. The system of claim 11, wherein the texture map manager is configured to generate a second texture map based on resampling of the first texture map by the texture map manager, the second texture map defining a second texture having the opposing edges that are symmetrical in shape.

14. The system of claim 13, wherein the texture map manager is configured to determine a value indicative of a distance that a texel of the second texture map is located from one of the opposing edges of the second texture and to mathematically combine the value with a value indicative of a separation distance between the opposing edges of the second texture.

* * * * *

UNITED STATES PATENT AND TRADEMARK OFFICE
CERTIFICATE OF CORRECTION

PATENT NO. : 7,502,030 B2  Page 1 of 1
APPLICATION NO. : 11/351211
DATED : March 10, 2009
INVENTOR(S) : Noah Horton et al.

It is certified that error appears in the above-identified patent and that said Letters Patent is hereby corrected as shown below:

In column 10, line 18, delete "1I1I" and insert -- 111 --, therefor.

In column 10, line 23, delete "III" and insert -- 111 --, therefor.

In column 17, line 26, delete "($L_{red}$, $L_{green}$)" and insert -- ($L_{red}$) --, therefor.

In column 17, lines 45-46,
delete "$L_{red}=F(u,v)=(A_{red})u_2+(B_{red})v^2+(C_{red})uv+(D_{red})u+(E_{red})v=F_{red}.$" and
insert -- $L_{red}=F(u,v)=(A_{red})u^2+(B_{red})v^2+(C_{red})uv+(D_{red})u+(E_{red})v+F_{red}.$ --, therefor.

In column 17, lines 54-55,
delete "$L_{blue}=F(u,v)=(A_{blue})u_2+(B_{blue})v^2+(C_{blue})uv+(D_{blue})u+(E_{blue})v=F_{blue};$" and insert
-- $L_{blue}=F(u,v)=(A_{blue})u^2+(B_{blue})v^2+(C_{blue})uv+(D_{blue})u+(E_{blue})v+F_{blue};$ --, therefor.

In column 17, lines 57-58,
delete "$L_{green}=F(u,v)=(A_{green})u_2+(B_{green})v^2+(C_{green})uv+(D_{green})u+(E_{green})v=F_{green}.$" and
insert -- $L_{green}=F(u,v)=(A_{green})u^2+(B_{green})v^2+(C_{green})uv+(D_{green})u+(E_{green})v+F_{green}.$ --, therefor.

In column 23, line 21, in Claim 4, delete "mare" and insert -- map --, therefor.

In column 23, line 46, in Claim 6, delete "mare" and insert -- map --, therefor.

In column 24, line 11, in Claim 8, delete "mare" and insert -- map --, therefor.

Signed and Sealed this

Twenty-first Day of July, 2009

JOHN DOLL
*Acting Director of the United States Patent and Trademark Office*